Figure 1:
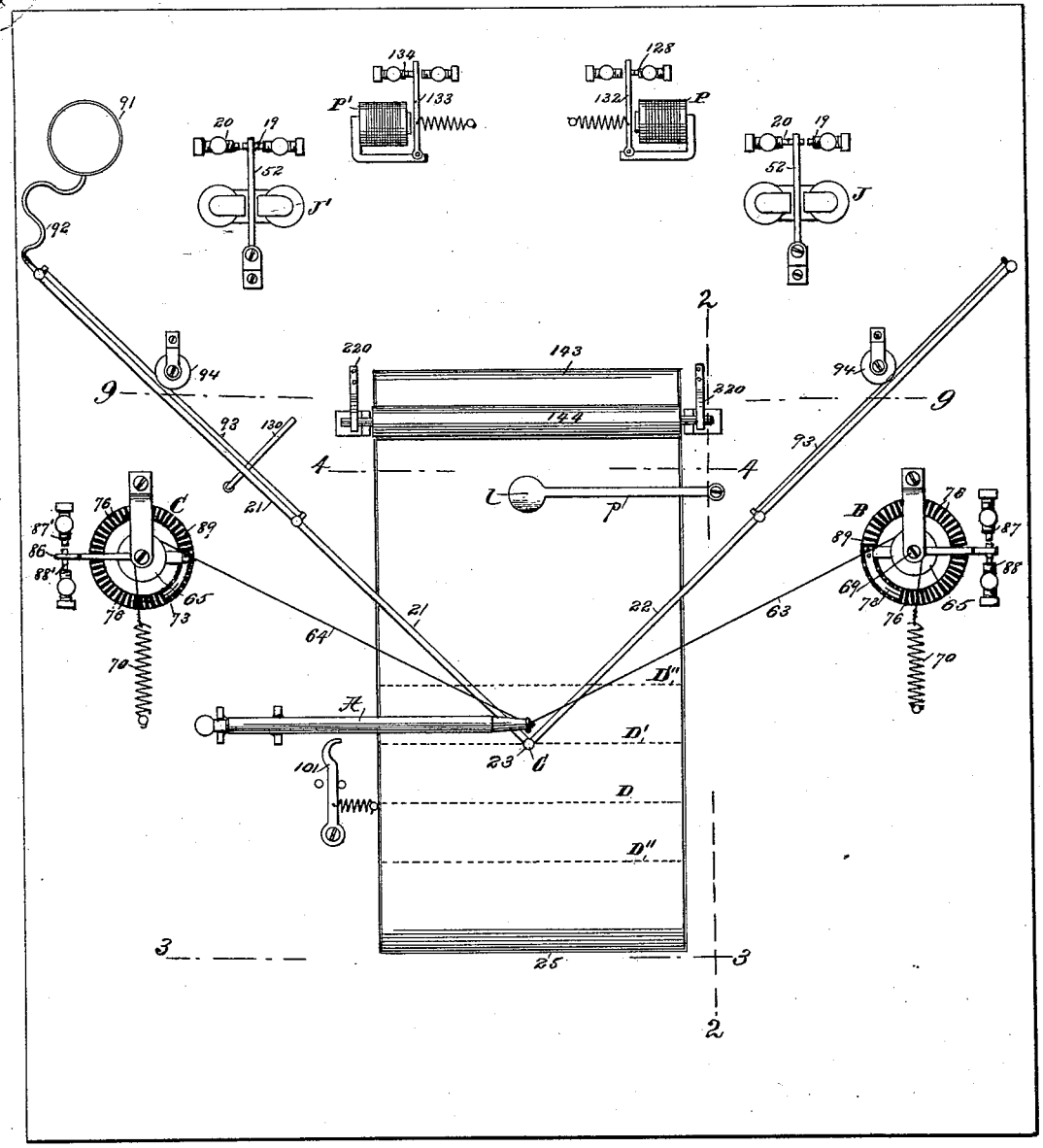

(No Model.)    10 Sheets—Sheet 1.

E. GRAY.
ART OF AND APPARATUS FOR TELAUTOGRAPHIC COMMUNICATION.

No. 461,472.    Patented Oct. 20, 1891.

Attest:
Geo H Roth
J J Kennedy

Inventor
Elisha Gray
By Philipp, Phelps & Honry
Attys (No Model.) 10 Sheets—Sheet 2.
E. GRAY.
ART OF AND APPARATUS FOR TELAUTOGRAPHIC COMMUNICATION.
No. 461,472. Patented Oct. 20, 1891.
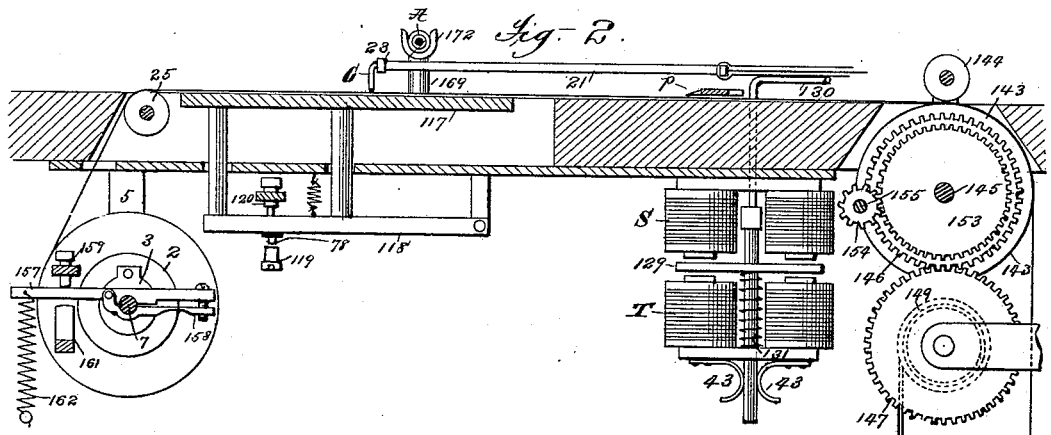
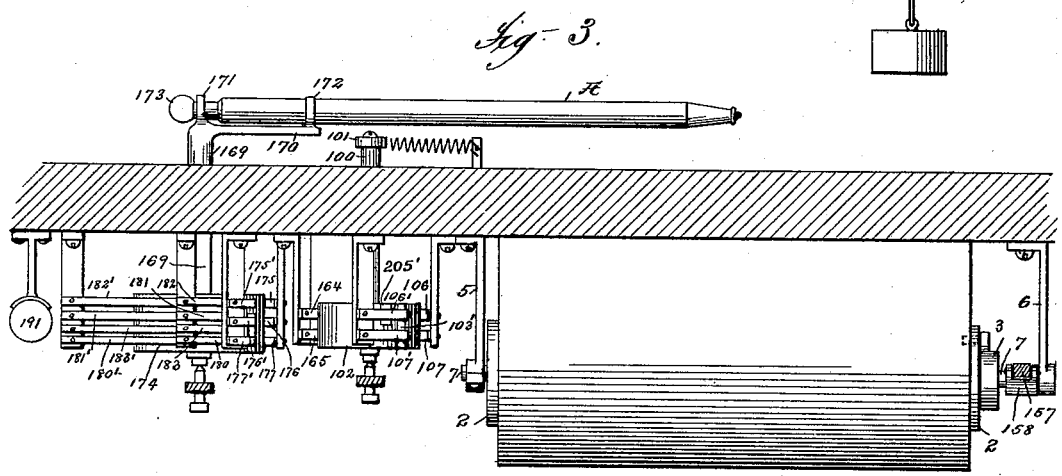
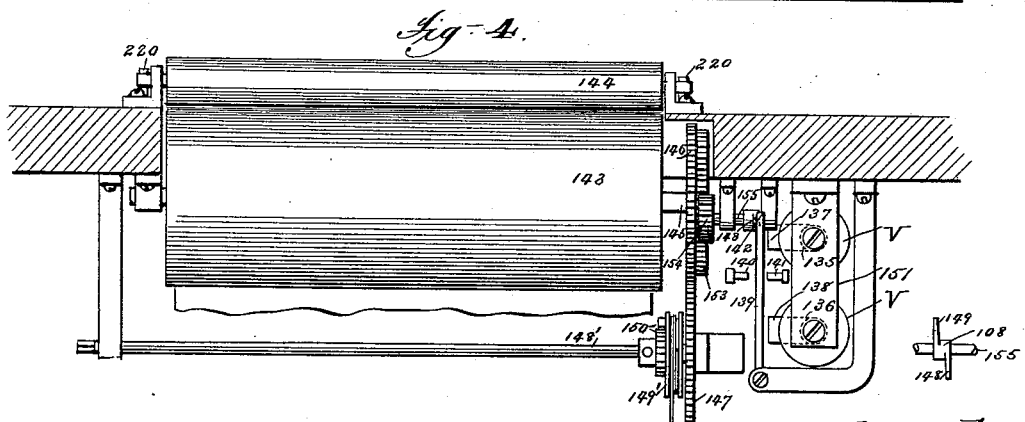

(No Model.) 10 Sheets—Sheet 3.
E. GRAY.
ART OF AND APPARATUS FOR TELAUTOGRAPHIC COMMUNICATION.
No. 461,472. Patented Oct. 20, 1891.
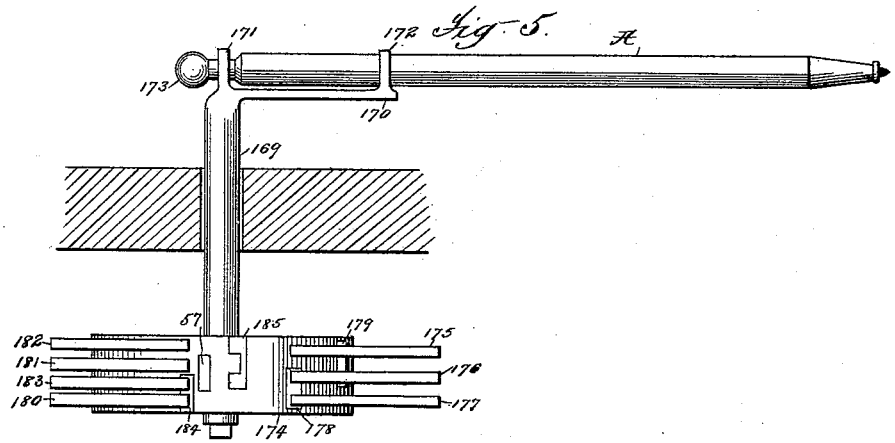
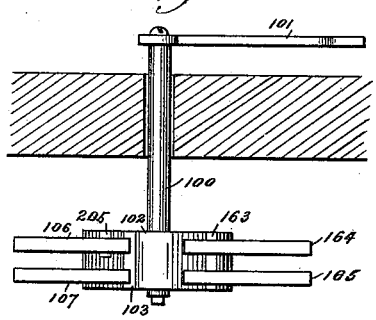 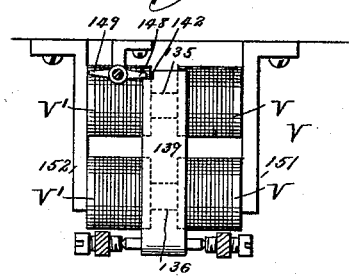
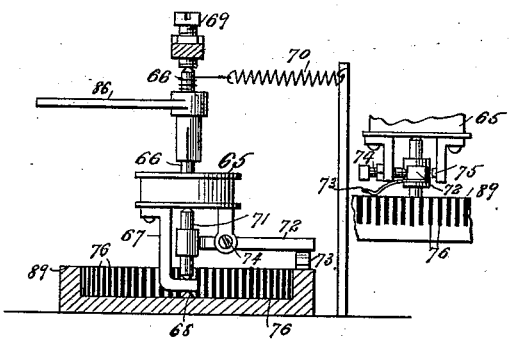

(No Model.) 10 Sheets—Sheet 4.
E. GRAY.
ART OF AND APPARATUS FOR TELAUTOGRAPHIC COMMUNICATION.
No. 461,472. Patented Oct. 20, 1891.
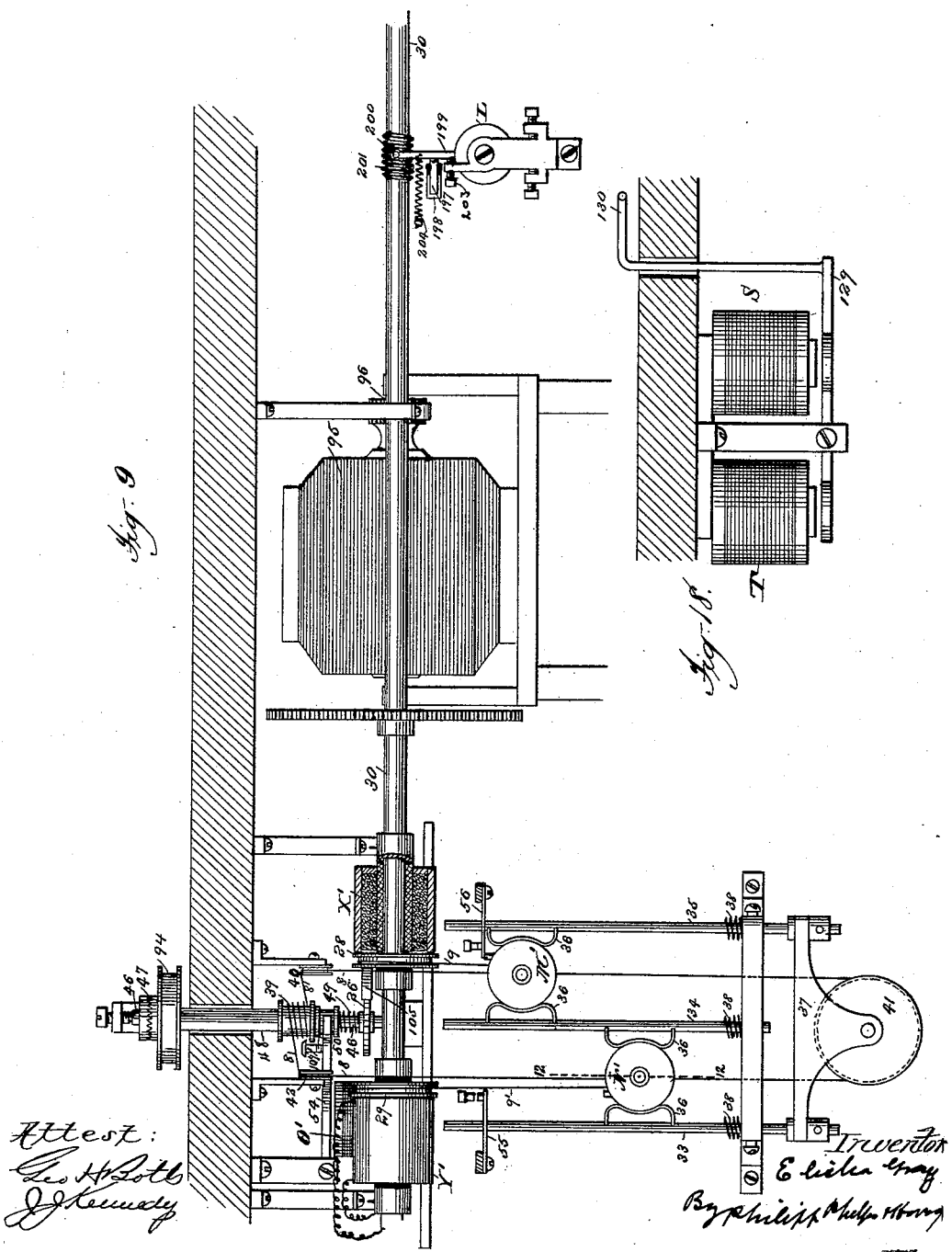

(No Model.)
10 Sheets—Sheet 5.
E. GRAY.
ART OF AND APPARATUS FOR TELAUTOGRAPHIC COMMUNICATION.
No. 461,472.
Patented Oct. 20, 1891.
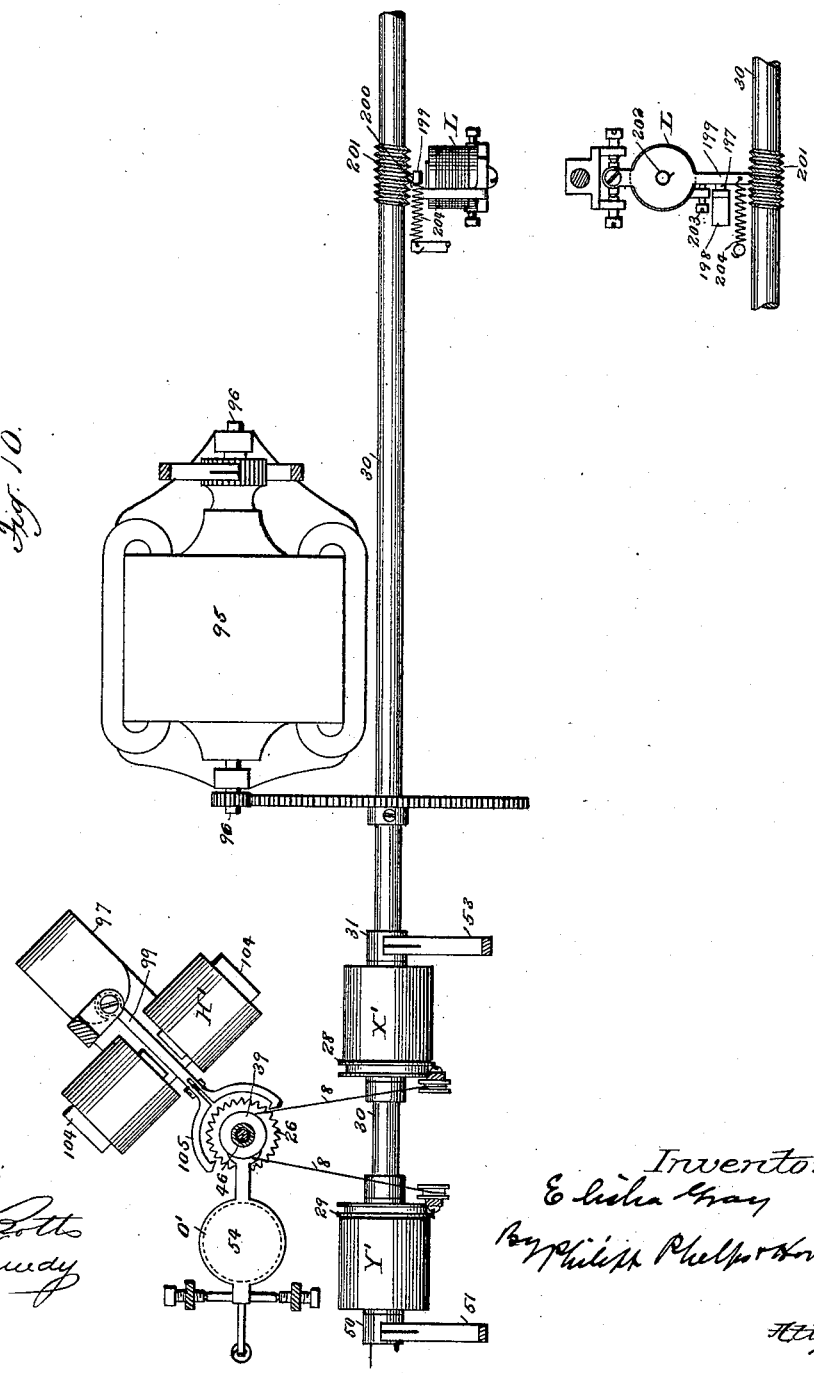

(No Model.) 10 Sheets—Sheet 6.
E. GRAY.
ART OF AND APPARATUS FOR TELAUTOGRAPHIC COMMUNICATION.
No. 461,472. Patented Oct. 20, 1891.
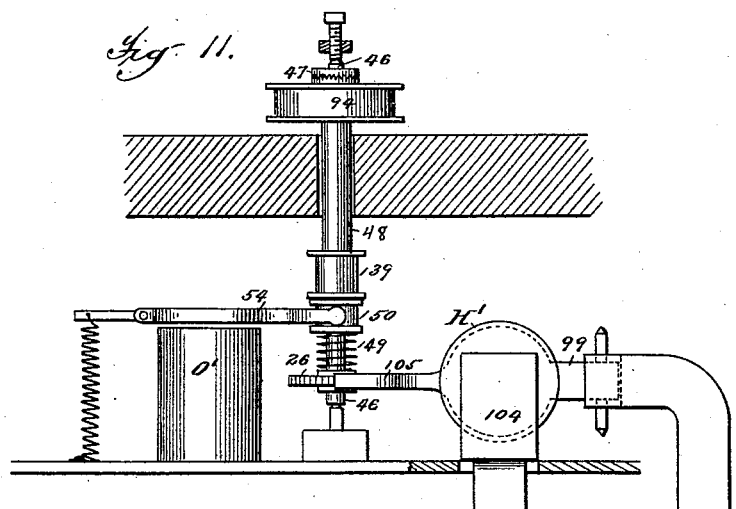
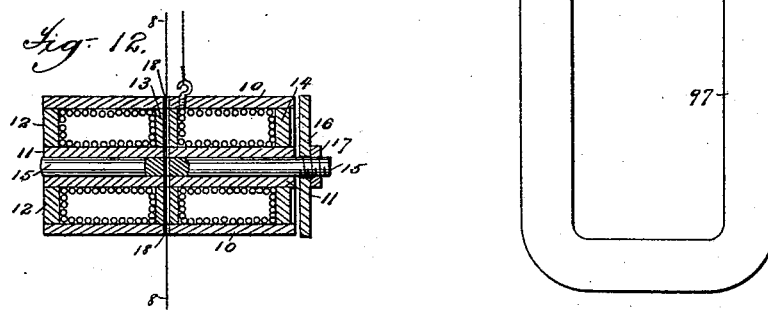
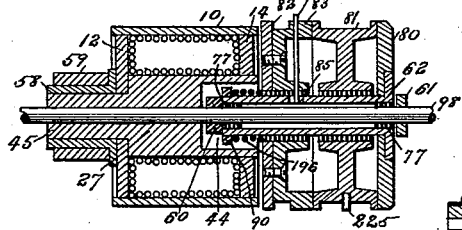
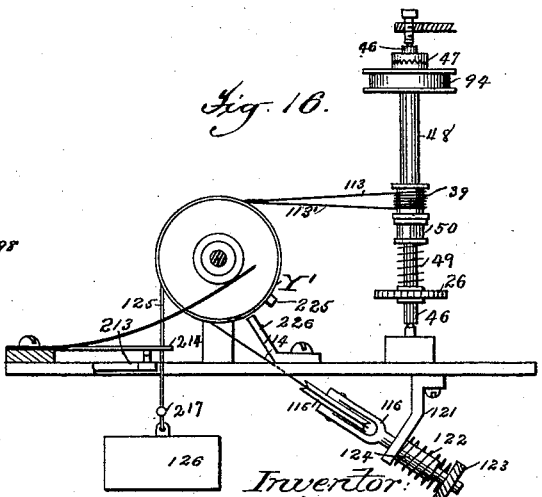

(No Model.) 10 Sheets—Sheet 7.
E. GRAY.
ART OF AND APPARATUS FOR TELAUTOGRAPHIC COMMUNICATION.
No. 461,472. Patented Oct. 20, 1891.
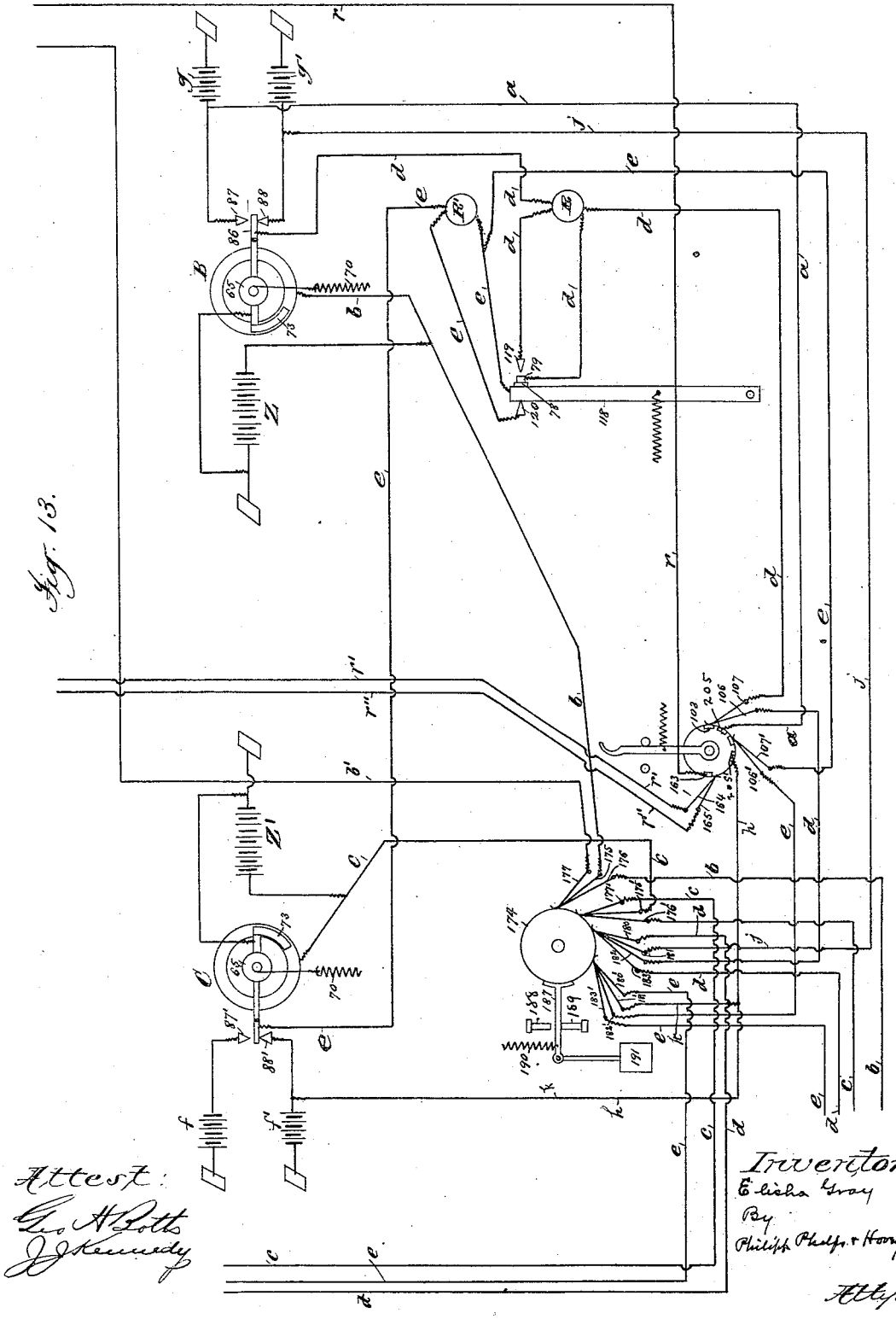

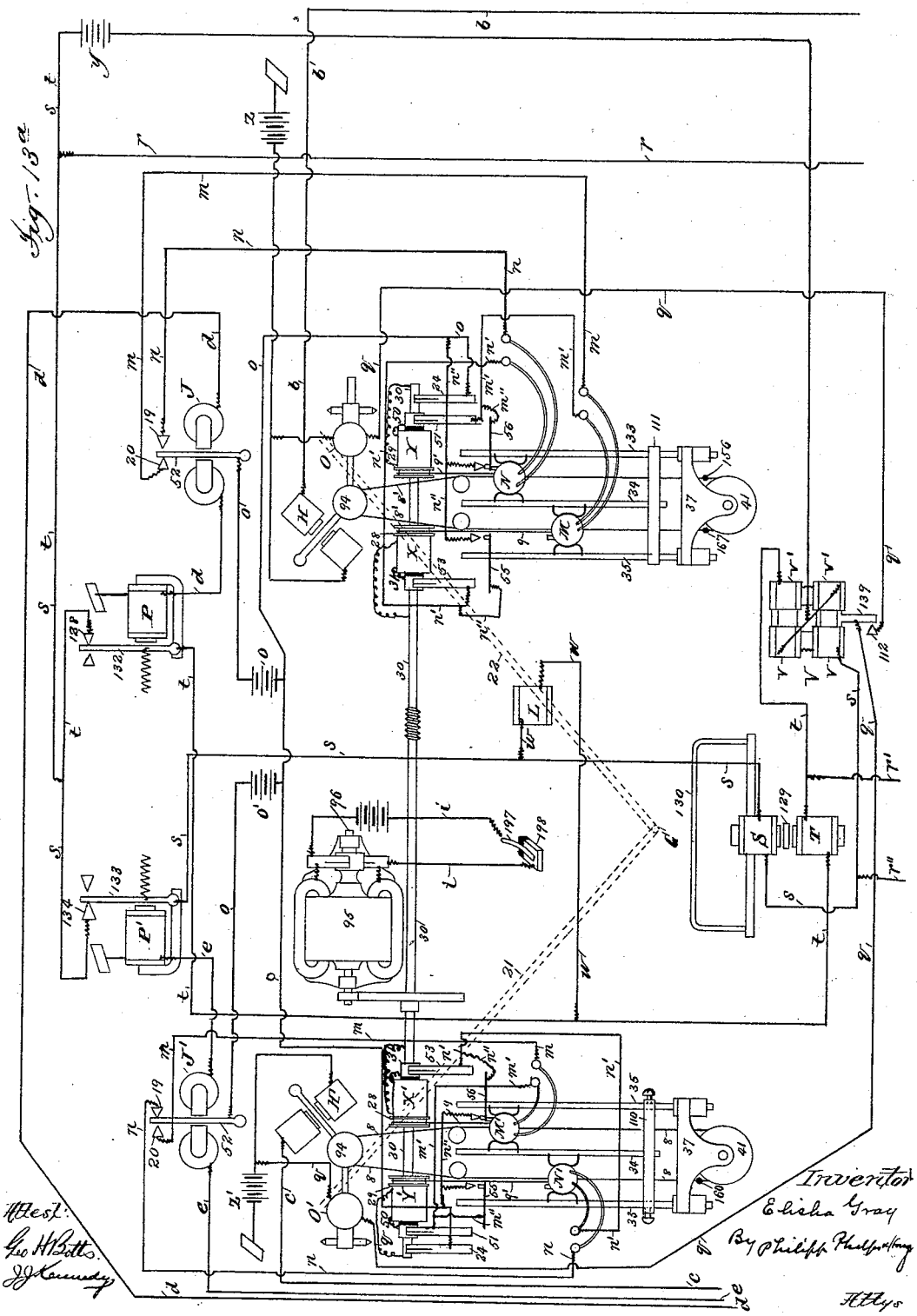

(No Model.) 10 Sheets—Sheet 9.
E. GRAY.
ART OF AND APPARATUS FOR TELAUTOGRAPHIC COMMUNICATION.
No. 461,472. Patented Oct. 20, 1891.
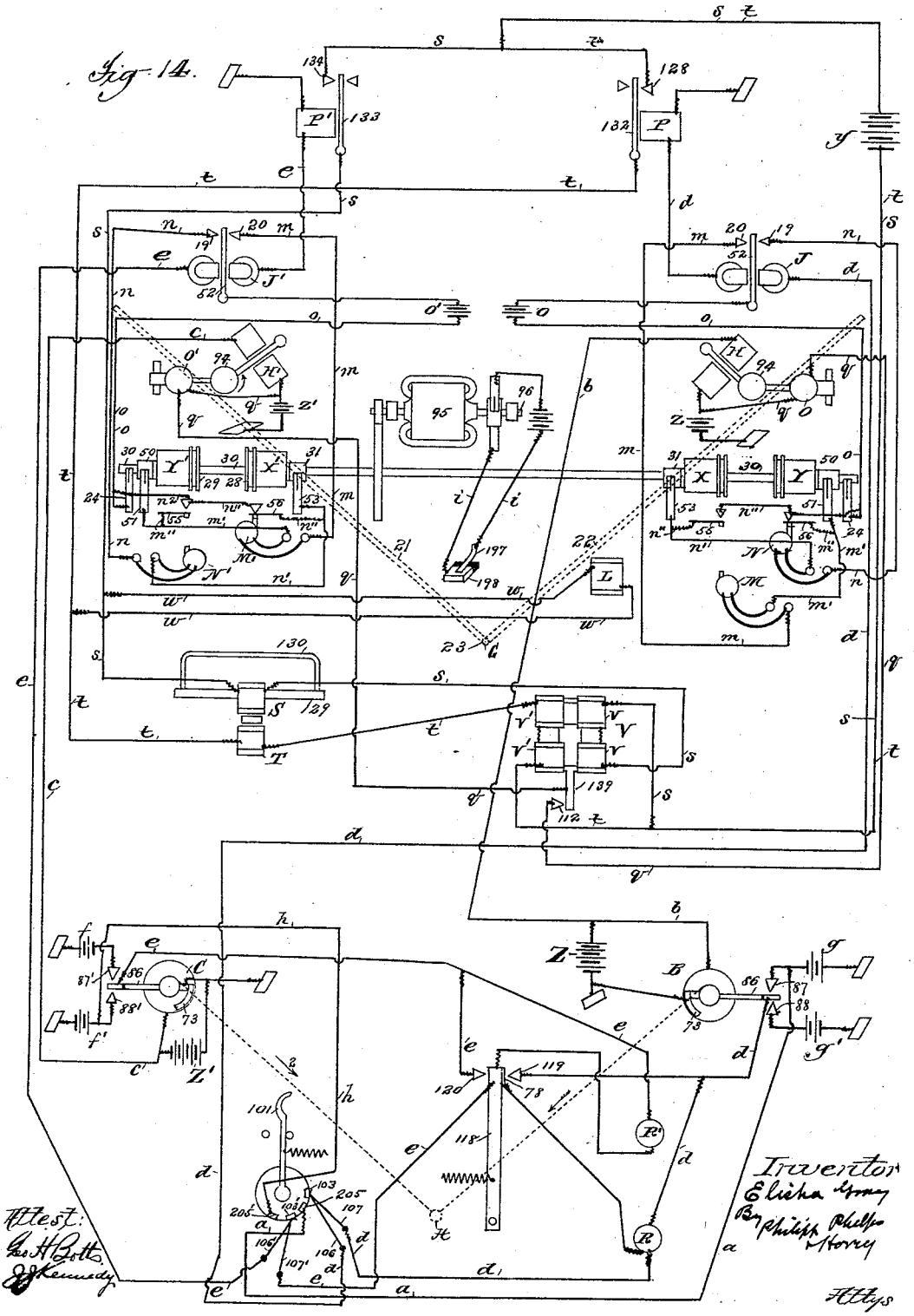

(No Model.) 10 Sheets—Sheet 10.
E. GRAY.
ART OF AND APPARATUS FOR TELAUTOGRAPHIC COMMUNICATION.
No. 461,472. Patented Oct. 20, 1891.
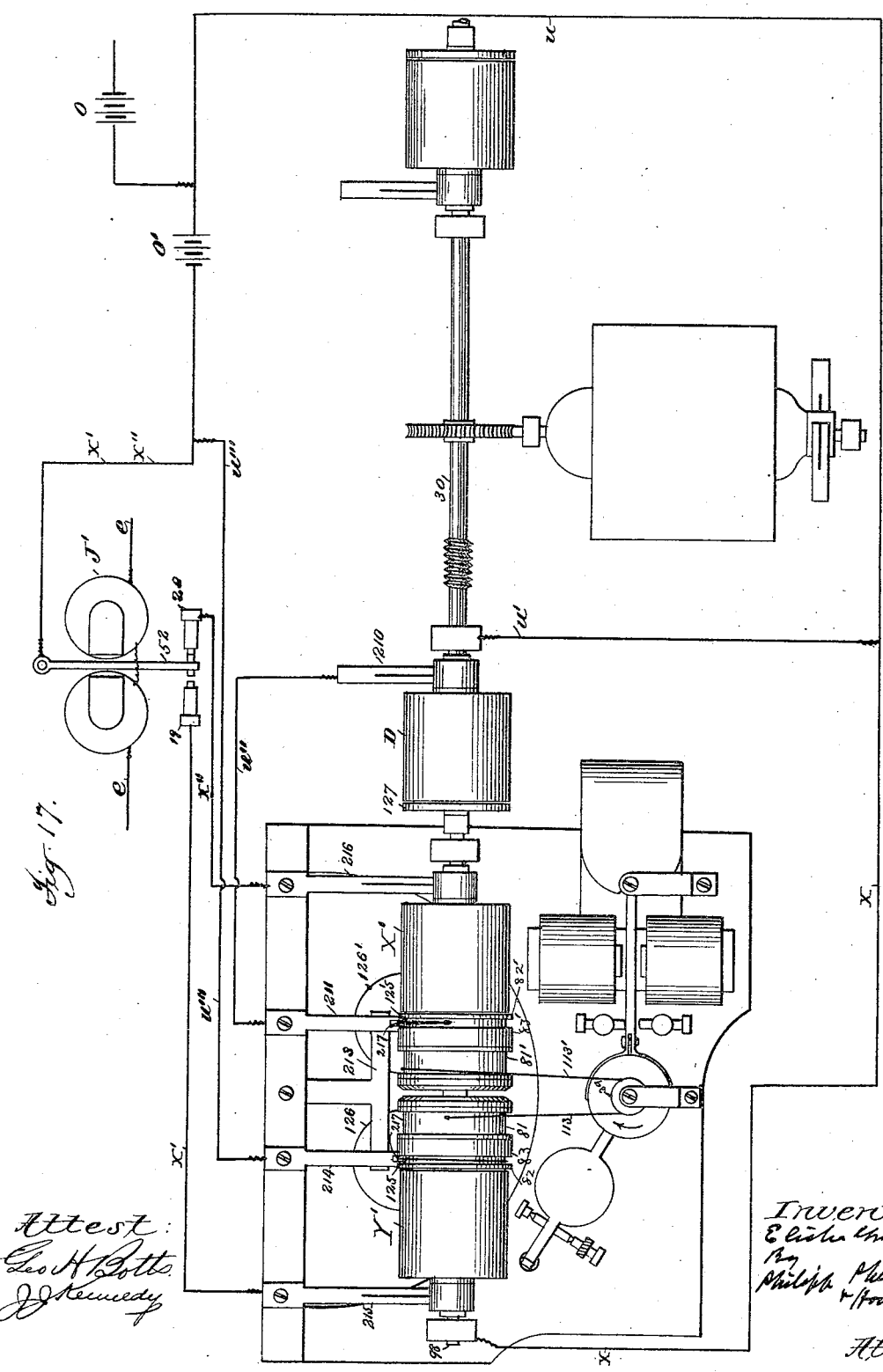

UNITED STATES PATENT OFFICE.

ELISHA GRAY, OF HIGHLAND PARK, ILLINOIS.

ART OF AND APPARATUS FOR TELAUTOGRAPHIC COMMUNICATION.

SPECIFICATION forming part of Letters Patent No. 461,472, dated October 20, 1891.

Application filed September 17, 1889. Serial No. 324,232. (No model.)

*To all whom it may concern:*

Be it known that I, ELISHA GRAY, a citizen of the United States, residing at Highland Park, county of Lake, and State of Illinois, have invented certain new and useful Improvements in Art of and Apparatus for Telautographic Communication, fully described and represented in the following specification and the accompanying drawings, forming a part of the same.

This invention relates to a writing-telegraph of that class in which the act of writing the message at the sending-station operates to reproduce it at the receiving-station, and it is in the main an improvement upon the methods, apparatus, and organization described in my former patents, Nos. 386,814 and 386,815, dated July 31, 1888.

The object of my present improvements is to secure greater speed in transmission and greater accuracy in reproducing the characters transmitted than have heretofore been possible.

In order that the detailed description of the methods and the apparatus and its organization hereinafter given may be more readily apprehended a brief statement of the general features of my present improvements will first be given.

It is a well-known fact that pulsations of successively opposite polarity can be sent over a line-wire with greater rapidity and certainty of effect than pulsations of successively like polarity. In my system as heretofore patented by me the pulsations used to operate the receiving-pen were pulsations of the latter sort. It is a feature of importance in my present improvements that pulsations of successively opposite polarity are employed. The movement of the transmitting-pen in either of two directions, preferably at nearly right angles to each other, produces a succession of these pulsations in two electric circuits, the number of pulsations in the respective circuits being determined by the distance which the pen is moved in the respective directions and the speed of succession of the pulsations varying with the rapidity of movement of the transmitting-pen. In my present system these pulsations do not preferably directly operate the motors which move the receiving-pen as do the pulsations sent to line in the system of my prior patents. I now propose, preferably, to produce a constant strain upon the apparatus which drives the receiving-pen, this strain originating in a motor, revolving shaft, weight, or other device or force independent, as regards its source of power, of the transmitting-instrument, and to govern the application of this force to the driving of the receiving-pen by means of an escapement operated by the pulsations above referred to. Thus each pulsation sent over the line will permit the receiving-pen to advance a space corresponding to one-half a tooth of the escapement-wheel, and as each pulsation represents a certain definite space traversed by the transmitting-pen and each tooth of the governing escapement-wheel of the receiver represents a certain definite space over which the receiving-pen is driven the movements of the transmitting-pen will be reproduced with almost absolute accuracy by the receiving-pen.

The devices above referred to provide for reproducing motion of the transmitting-pen in two directions crosswise of each other. The additional devices for reversing the direction of movement of the receiving-pen consist of a reversing mechanism controlling the connection between the receiving-pen and the power mechanism which drives it and of an organization adapted to electrically control this mechanism from the transmitting-station. The reversing mechanism may be introduced as a direct gearing between the motor or its shaft and the receiving-pen, and the motion of the motor or its shaft be thus directly transmitted to the pen in one direction or the other, according to the position of the reversing mechanism. Such a construction is shown in an application for Letters Patent filed by me on the 13th day of June, 1889, Serial No. 314,151, and is embraced within those of the claims of the present application not specifically limited to the construction herein shown and described. A preferred method of reversing is to apply the power of the motor to the winding up of weights and to cause movement of the receiving-pen by the downward pull of these weights, releasing one or the other of them, according to the direction of motion to be given to the receiving-pen, these weights and connections constituting a reversing mechanism between the motor and the receiving-pen. A more uniform and more delicate and reliable movement is thus given to the receiving-pen than where the motion is transmitted directly from the motor. These weights, two in number, are each attached by a cord to a disk loosely mounted upon the revolving motor-shaft, each of these disks being provided with means for clutching it to the shaft when desired. Each of the weights is also provided with means for causing it to act at the proper moment upon the drum which gives movement to the receiving-pen. The connections are so made that while one weight is by its descent giving motion to the receiving-pen the other weight is being lifted by its disk, and vice versa. The preferred form of clutches for operating the reversing-gear in the one case and for connecting the disks to the shaft in the other are electro-magnetic clutches which are thrown into and out of operation by the closing or breaking of a circuit, this circuit being controlled by proper connections from the transmitting-station. These devices, like the other parts of the apparatus, are duplicated for the two branches of the system, and are governed, respectively, in accordance with the reversals of the transmitting-pen in its two directions of motion. A feature of special importance in this organization is the electro-magnetic clutch, which has great advantages in delicacy and certainty of control from a distance over any form of mechanical clutch. The weights which drive the receiving-pen in this organization may be regarded as independent and primary sources of power, giving to the pen-drum a tendency to move in opposite directions, respectively, one or the other of which is thrown into operative connection with the drum, according to the direction of motion desired. It is conceivable that the work of lifting these weights might be performed by the hand of the operator, instead of by a part of the organized machine. So, too, these two weights, regarded as primary sources of power, might be replaced by two motors arranged to act oppositely upon the pen-drum. It is therefore to be understood that, broadly considered, the motor is not a necessary part of my invention, and that in a broad sense a single source of power provided with a reversing mechanism and two sources of power opposed to each other and provided with means for throwing one or the other into operative connection, as desired, are equivalents of each other.

Another form of mechanisms for moving and reversing the motion of the receiving-pen and which are, broadly considered, equivalent respectively to the pen moving and reversing apparatus described and claimed herein, and therefore embraced within the broader claims hereof, is described and claimed in my application, Serial No. 365,705, filed September 22, 1890.

My improvements also include devices and an organization of circuits for securing unison between the transmitting and receiving pens and improved apparatus and organizations for raising and lowering the receiving-pen to correspond with like movements of the transmitting-pen and for shifting the paper.

The reversal in direction of motion of the receiving-pen may be effected from the transmitting-station by means of changes of condition in the currents traversing the two main circuits. Thus, for instance, a temporary impulse of increased strength may be sent over the line, which shall have the effect of operating the reversing mechanism, and the system may thus be operated through two main lines, as in the organization of my former patents. Such a construction is shown in the application, Serial No. 314,151, above referred to. On the other hand the reversal may be effected by means of one or more independent wires. Such an organization has the advantage of simplicity in electrical connections and mechanism at the stations, and for that reason is preferred, and is the form shown and described in this application. There is, however, no substantial difference in principle between that organization in which the reversal is effected by a change of condition in the main-line currents and that in which it is effected by the operation of independent circuits. Likewise the operations of raising and lowering the receiving-pen following like movements of the transmitting-pen and that of bringing the two instruments to unison and the shifting of the paper at the receiving-instrument may be effected either through changes of condition in the currents on the two main-line circuits or by the action of independent circuits. Either method is an equivalent for the other, as regards the broader features of the invention, and a substitution of one for the other does not introduce substantial changes into the organization as regards those features. When separate line-wires are used for effecting reversal, I prefer to use those line-wires for the pen-lifting, paper-shifting, and unison devices, and have shown such a construction in this application. It is, however, to be understood that this application is intended to embrace in its broad features both the construction in which separate wires are used for the reversing, pen-lifting, paper-shifting, and unifying operations, and that in which these operations are effected by changes in the condition of the main-line currents. In fact, I do not intend to limit myself to any particular arrangement of electrical connections between the transmitting and receiving station or number of line-wires.

Other novel features in organization and detail of construction will be hereinafter described in detail and specifically referred to in the claims.

The improvements thus briefly outlined will now be described at length, reference being had to the accompanying drawings, in which—

Figure 1 is a plan view of the table carrying the transmitting and receiving instruments at one station. Fig. 2 is a vertical section on or near the line 2 2 of Fig. 1, showing the paper-shifting mechanism and the pen-lifter magnets. Fig. 3 is a vertical section on the line 3 3 of Fig. 1, showing the paper roll and pen-rack and unison-switches in perspective. Fig. 4 is a vertical section on the line 4 4 of Fig. 1, showing the mechanism for feeding the paper in elevation. Figs. 5 and 6 are views on an enlarged scale of the pen-rack and unison-switches. Fig. 7 is a detail of the interrupter. Fig. 8 is a detail view of the paper-shifting magnet. Fig. 9 is a sectional elevation taken on about the line 9 9 of Fig. 1, the point of view being in the foreground of the latter figure. Fig. 10 is a plan view of the parts shown in Fig. 9, the table being removed, a side detached view of magnet L and its connections being also shown. Fig. 11 is a view on an enlarged scale of the escapement-magnet and connected devices. Fig. 12 is a sectional elevation of one of the weight-magnets, taken on the line 12 12 of Fig. 9. Figs. 13 and 13ª show the circuit connections in diagram at one station. Fig. 14 is a diagram showing a transmitter and transmitting connections at one station and a receiver and receiving connections at the distant station. Figs. 15, 16, and 17 represent a modified form of the magnetic reversing mechanism. Fig. 18 is a modified form of pen-raising magnet.

In my system as now organized I prefer to place the transmitting and receiving instruments in close proximity, and so arranged with reference to each other that a single sheet of paper is used for making the copies of messages transmitted and for recording messages received. I have therefore shown the transmitting and the receiving instruments associated together in Fig. 1.

Referring now particularly to Figs. 1 to 8, 13, and 13ª, the principal features of the transmitter will be described. This instrument consists, primarily, of the transmitting-pen A, which is moved by the operator to form the characters or other matter to be transmitted. This pen, as I have stated in my former patents, may be a simple handle of convenient form, or a pen or pencil, with which a copy of the message transmitted is made, and it is therefore termed a "pen;" but this term, whenever used in a general sense, is to be understood as including any writing-instrument or a simple handle of convenient form. The pen A is connected at its tip to two cords or other flexible connections 63 64, which extend horizontally crosswise of each other and are connected to operate the two circuit-changing devices B C, (termed herein "interrupters,") located in the two electric circuits $b$ $c$, (termed "main circuits,") and so arranged that as the pen A is moved in the direction of the cord 63, to or from the interrupter B, pulsations are produced in the circuit $b$ in quick succession, varying in number with the linear extent of movement of the pen A and varying in speed of succession with the rapidity of such movement, while as the pen is moved in the direction of the cord 64 to or from the interrupter C in forming the characters, pulsations are produced in circuit $c$ in the same manner. In my former telautograph patents the interrupters are so placed with reference to the transmitting-pen that the connecting-cords 63 64 extend in directions approximately parallel and perpendicular to the line of characters traced by the transmitting-pen. In my present organization, however, I place the interrupters in such positions that the cords will have a diagonal location about midway between lines perpendicular to and parallel with the line of writing. By this organization the steps causing the perpendicular and horizontal movements of the pen, which are the movements naturally made most rapidly in writing, are divided between the two halves of the machine, thus enabling a much greater speed to be attained without increasing the working capacity of either circuit. This organization also makes possible a greater degree of compactness in the apparatus, and thereby the use of one strip of paper for the transmitting and receiving instruments at the same end of line.

The function of the interrupters in my present transmitting-instrument is not only to cause pulsations in the main-line circuits, but to cause those pulsations to be of successively opposite polarity. That this may be effected each main circuit is provided with two batteries, one at the transmitting and one at the receiving end, so placed in line as to be opposed to each other in polarity, the one at the transmitting end being of about treble the strength of the other. The larger batteries in the two circuits are designated, (see Figs. 13 and 13ª,) respectively, Z and Z′, and the smaller batteries, respectively, $z$ and $z'$. The interrupter is so arranged as to shunt the larger battery out of line at short intervals.

The two interrupters B C and their auxiliaries and circuit connections are exact duplicates, and a description of one of them therefore applies to both. Each of the cords 63 64 is connected to and wound upon a small drum 65, (see Figs. 1 and 7,) fixed upon one of its sides to a shaft 66. To the other side of the drum is attached a bracket 67. The outer end of this bracket rests upon a pivot 68, and the upper end of the shaft 66 is in contact with a pivot 69. The drum is thus mounted so as to revolve between the pivots 68 69. To the shaft 66 is attached a spring 70, which is wound upon the shaft and tends to revolve the drum in the direction opposite to the pull of the pen upon the cords 63 64. Pivoted between the lower face of the drum and the bracket 67, and in line with the shaft 66, is another shaft 71, to which is attached an arm 72, which carries the revolving brush 73. The movement of the arm 72 upon its shaft 71 is limited between stops 74 75, fixed to the drum, (see Fig. 7,) one of which 74, as shown, is preferably adjustable. The face of the disk over which the brush 73 sweeps is provided with a series of channels or cuts located in proximity and containing pieces of insulating material 76, the width of each channel or cut being preferably about the same as that of the adjacent exposed metal surface between it and the next channel. Each main-line circuit divides before reaching the interrupter, (see Fig. 13,) one branch passing through the battery Z or Z' at the transmitting end of line and to earth, the other branch connecting with the interrupter-disk, the brush 73 being grounded. When, therefore, the brush is in contact with the metal surface of the disk, the battery Z or Z' will be cut out and the battery $z$ or $z'$ at the receiving end of the line will alone be in circuit. When, however, the brush 73 rests upon a portion of the insulating material, the branch through the interrupter will be broken and both batteries Z or Z' and $z$ or $z'$ will be in circuit, their polarity being, as before stated, opposed to each other. In this condition the current of the smaller battery will be overcome and the polarity of the current on line determined by the large battery. The strength of the larger batteries is preferably made about triple that of the smaller batteries, so that the effective current on line is the same (except in polarity) when both batteries are in circuit as when the smaller battery alone is in circuit, and the effect on the receiving-instrument will be in both cases the same. The revolution of the brush over the face of the disk will thus cause upon the line a succession of pulsations of opposite polarity and substantially equal effective strength, the number and rapidity of these pulsations being determined by the extent and rapidity of movement of the brush. The mounting of the brush with reference to the drum gives the brush an independent motion, the amount of this motion being adjustable by means of the adjustable stop 74. It results that in practice whenever the motion of the pen reverses the rotation of the drum the brush will not begin to move in a reverse direction until the drum has so moved a distance corresponding to the amount of independent motion of the arms 72 between the stops 74 75. The object of this independent or lost motion of the brush will be stated hereinafter.

In addition to the two main circuits $b$ $c$, the system is provided, as above stated, with two secondary circuits for changing the direction of motion of the receiving-pen upon the reversal in the direction of motion of the transmitting-pen in the two crosswise directions respectively, and performing the other functions mentioned above. These circuits are termed for convenience "reversing-circuits," and are indicated in the drawings by the letters $d$ $e$. It may be here remarked that in the organization in its preferred form, and as shown in Figs. 13 and 13$^a$, I use a pen-rack switch similar to that shown in my above-mentioned patents, which throws the instrument from the transmitting position to the receiving position when the pen is placed in it, and also performs another function, which will be hereinafter referred to. I have, however, for the sake of simplicity omitted this switch from the system, as shown in Fig. 14, and will first describe the system without reference to it and as shown in Fig. 14, afterward explaining the construction and circuit connections of the switch.

Referring now particularly to Fig. 14, it will be seen that there is a circuit making and breaking arm 86 frictionally mounted upon the drum-shaft 66 of each of the interrupters B C, and that these arms have a limited motion between contact-stops 87 88 87' 88', contact-stops 87 88 being connected to earth through batteries $g$ $g'$, respectively, the battery $g$ having its negative plate toward the contact-stop 87 and the battery $g'$ its positive plate toward the stop 88, and that batteries $f$ $f'$ are similarly arranged with reference to stops 87' 88'. The circuits $d$ $e$ connect with the insulated tips of the arms 86, respectively, and thence pass to line through resistances R R' and switches for each line connected with arm 101, the purpose of which will be hereinafter explained. Circuits $d$ and $e$ and their connections are precise duplicates of each other.

When the pen is moving in the direction of the arrow in Fig. 14—that is, from the interrupter B—the arm 86 of that interrupter will be in contact with the stop 87 and a current of negative polarity will pass to line over reversing-circuit $d$ from battery $g$. When the motion of the pen is reversed and it is caused to move toward the interrupter B, the arm 86 will at the moment of reversal leave the stop 87 and come into contact with stop 88, which will cut battery $g$ out of and battery $g'$ into circuit $d$, thus producing a positive current in that circuit.

The operation of the transmitter as thus far described is as follows: The operator takes the pen A in his hand and forms the characters in proper sequence in the usual manner, moving the pen up and down and from left to right, the same as in ordinary writing. As the pen makes the downstrokes in forming the characters the cords 63 64 will be unwound from the drums of the interrupters B C, thereby rotating the drum and its shaft and moving the brush 73 over the disk 89 and causing a succession of pulsations of opposite polarity over the circuits $b$ $c$ in quick succession, the number and rapidity of the pulsations being determined by the speed and extent of movement of the pen. As the pen makes the upstrokes the springs 70 will rewind cords 63 64 and move the brushes 73 in the reverse direction, causing pulsations upon the two main circuits in the same manner. So long as the pen recedes from either of the interrupters, as B, the shaft 66 will continue to revolve in one direction and the arm 86 will be held against the stop 87. As soon, however, as the movement of the pen is reversed—i. e., changed from a motion from the interrupter B to a motion of approach to the interrupter—the movement of the shaft 66 will be reversed and the arm 86 will be caused to rest against the contact 88, thereby changing the polarity of the current on reversing-circuit $d$, and this change of polarity in the reversing-circuit will occur as often as reversal in the direction of movement of the transmitting-pen with reference to interrupter B occurs, or, in other words, the movement of the transmitting-pen in one direction—as, for instance, from the interrupter B—will correspond to a condition of negative polarity in the reversing-circuit $d$, and movement of the transmitting-pen in the opposite direction will correspond to a condition of positive polarity in the reversing-circuit $d$. The same succession of operations occurs in connection with the circuit $c$, the interrupter C, and the reversing-circuit $e$ and connected parts, and the same change in the polarity of the current traversing the last-named circuit upon each reversal in the direction of movement of the transmitting-pen with reference to the interrupter C.

The purpose of the independent or lost motion in the arm 72 and brush 73 heretofore described is to allow the reversal of the receiving mechanism to be made while the brush is standing still, whether on a metal or insulating segment of the disk. To accomplish this the stroke of the arm 86 is made as short as possible—say the two hundredth of an inch—while the play of the brush between its stops is made a trifle longer. This provision for lost motion in the brush 73 is not absolutely essential for perfect writing, but prevents possible loss of steps at the receiving end when the writing is done at a high rate of speed, and is therefore a preferred construction.

Referring now particularly to Figs. 1, 9 to 12, and 14, the principal features of the receiver will be described. The receiving-pen G is a writing-instrument of any suitable form for recording the message. The term "pen," therefore, as applied to this instrument is to be understood as including any form of writing-instrument. In the case shown a fountain-pen is employed, which is composed of a tube of glass of very fine capillary bore, having its end formed into a writing-point. This pen is connected by a piece of flexible rubber tubing, which runs through the tubular pen-arm 21 and connects by means of a preferably flexible capillary tube 92 with the inkwell 91, as described in my former patents. The pen-arms 21 and 22 are made of light metal tubing hinged at the point 23 immediately over the point of the pen. Each of the arms 21 22 is provided with a cord 93, attached to the arm at each end and having a turn about a drum 94. Motion is given to the receiving-pen by the revolution of these drums 94, and this revolution is effected in correspondence with the movements of the transmitting-pen by means of a mechanism which will be presently described. The receiving-pen arms are so adjusted with reference to the pen and the cords upon the drum that the distance from the receiving-pen to the hinging-point on drum 94 of either of its pen-arms will be equal, when the transmitting and receiving instruments are in unison, to the length of the unwound cord connecting the transmitting-pen with the drum of the interrupter upon the same side of the instrument. This organization causes the transmitting and receiving pens to swing in arcs having the same radii, and consequently to that extent insures an exact reproduction by the receiving-pen of the movement of the transmitting-pen. It will be observed that this advantage is in part secured by the transfer of the circuit-changing arm 86 to the shaft of the interrupter from a position between the interrupter and the transmitting-pen.

The revolution of the drums to move the receiving-pen is effected in my present organization by power derived from a motor 95, (see Fig. 9,) and the application of the power of the motor to the pen-drums is controlled by reversible escapements governed by the pulsations sent over the lines, as above described. The motor may be of any suitable construction, the form which I prefer, and which is shown in this application, being an electric motor. The shaft 96 of this motor is geared to a shaft 30, from which both of the pen-drums 94 receive their motion. As the parts driven by the shafts are identical in construction on both sides of the machine, but one set thereof is described and shown in full—to wit, that upon the left-hand side of the machine as it appears in Fig. 1. The following description may therefore be understood as applicable to both of these sets of devices. The shaft 30 is (see Fig. 10) suitably trunnioned or journaled so as to revolve freely and passes loosely through two soft-iron disks 28 29, circumferentially grooved. Fast on the shaft 30 and on either side of the disks 28 29 are two clutch-magnets X' Y', (the corresponding clutch-magnets on the right-hand side of the instrument being designated by the letters X Y, respectively,) which are fastened to and revolve with the shaft 30. The shaft 30 is preferably of brass, the cores of the clutch-magnets being made of soft iron and bored out of such size as to allow the shaft to slip into the hole and fit tightly therein. The head of each magnet-spool at the end nearest the disk is made of non-magnetic material, as hard rubber, and the outer shell or covering is of soft iron, as is also the head of the spool farthest from the disk. The ends of this shell and of the core next to the disk project forward slightly beyond the head and come into contact with the disk, which constitutes an armature for the magnet. There is thus formed a frictional magnetic clutch, which may be electro-magnetically controlled from the transmitting-station, as hereinafter described. In practice the magnetizable metallic surfaces of the magnet and disk, respectively, may be in actual contact; but to prevent sticking upon the demagnetization of the clutch I find it preferable to face one or both of the adjacent surfaces with a layer of non-magnetic material, as parchment. Both of these magnets X' Y' with their connected parts are exactly alike. Attached to each of the disks 28 29 is a cord 9 9', (see Fig. 9,) so placed as to lie in the groove of the disk. These cords are attached at their lower ends to weights M' N'. These weights are of peculiar construction, each weight being in fact a magnet or provided with a magnetically-controlled clutch. There is a shell 10 and core 11, (see Fig. 12,) connected at one end by a soft-iron disk 12, and at the other end and in the center by disks 13 14 of non-magnetic material, as brass or hard rubber. Extending through the bore of the core 11 is a rod 15, non-magnetic, to one end of which is attached a soft-iron disk 16. It is desirable that this disk should be adjustable, and to this end it may be threaded upon the rod 15 and held in position by a nut 17. The insulated wire-coils of the magnet are wound in the spaces between the core, shell, and disks, as shown. The terminals of the coils pass out preferably through the disk 12 and are joined to flexible connecting-wires, (see Fig. 13ª,) as will be described farther on. The rod 15 fits the bore of the core 11 closely, but not so as to prevent ready movement to and fro within it. A small hole 18 is bored through the outer shell 10, the disk 13, the core 11, and the rod 15, and through this hole is passed a cord 8. When the current is caused to pass through the coils of the weight M', magnetism will be excited in the ends of the core 11 and shell 10 nearest the disk 16, thereby drawing the disk up into contact with the ends of the core and shell and shifting the position of the rod 15 in the bore of the core, causing the edges of the hole 18 in the rod to clutch the cord 8 tightly, so that the cord cannot be moved readily without carrying with it the entire weight M'. The weight M' will thus remain gripped upon the cord until the current traversing the magnet-coils is interrupted—that is, until the clutch formed by the edges of hole 18 through rod 15 and core 11 is opened—when the resiliency of the cord 8 and the pull of the magnet-weight M' will cause the rod 15 to move back to that position in which the hole through it registers with the hole through the core and the grip upon the cord will be relaxed. The cord 8 is endless, passing through both of the weights M' N', over guide-pulleys 40 42, around a drum 39, to which it is attached and an idle-wheel 41, which prevents slackening of the cord. The weights are adapted to slide vertically in a frame composed of vertical rods 33 34 35, fixed in any suitable manner to the frame-work supporting the instrument and are connected to the rods, so as to slide thereon by brackets 36. The idler 41 is mounted in a yoke 37, which is free to move vertically a short distance. Buffer-springs 38 at the lower ends of the guide-rods serve to prevent injury to the magnet-weights in case of sudden extreme drop. The drum 39, about which the cord 8 passes and to which it is attached, is mounted upon one end of a sleeve 48, which carries upon its other end the pen-drum 94. The latter drum is connected through a V-toothed clutch 47 with a trunnioned shaft 46, having upon it an escape-wheel 26. The pallets 105 of this escape-wheel (see Fig. 10) are preferably made adjustable to and from each other and are attached to the armature of a magnet H', (the corresponding magnet on the other side of the instrument being designated H.) The angles of the faces of the escapement-pallets 105, as also those of the faces of the escape-wheel teeth, are preferably made the same, so that the escapement will be reversible and operate in either direction with equal facility upon reversal of the strain which tends to move it. This magnet is a polarized relay of any suitable construction. In that shown the polarization is effected by a permanent magnet 97, one end of which is attached to the iron yoke 104, which connects the cores of the two magnet-coils, and the other end embraces in close proximity the rear end of the armature 99, trunnioned in the frame-work. The upper half of the clutch 47 is fixed to the shaft 46 and the lower half to the drum. The two halves are held together by the pressure of a spring 49, one end of which bears against the hub of the escape-wheel and the other against a loose grooved collar 50, which in turn bears against the lower end of drum 39. So long as the pressure of the spring 49 acts upon collar 50 and crowds it against the drum 39 the jaws of the clutch 47 are held together, and thereby the sleeve 48 and drums 39 94 are rigidly connected with the shaft 46, and by it with the escape-wheel, so that the strain of the weights acting upon the drum 39 will be held in check by the escape-wheel. Fitted to the groove in the collar 50 is a forked extension of an armature 54, trunnioned in the ordinary manner in proximity to a magnet O', (the corresponding magnet on the opposite side of the instrument being lettered O.) When this magnet is energized, it pulls down the armature 54 and thereby withdraws the collar 50 from contact with the drum 39, permitting the jaws of the clutch 47 to separate and disconnecting the escapement. The object of effecting this disconnection will be hereinafter explained.

In practice I find it desirable to provide means for positively opening the clutch 47, instead of depending upon gravity entirely to effect it. For this purpose I attach to the armature 54 a catch 109, which may be an ordinary screw, and the head of which is so placed as to engage with the lower flange of the drum 39 when the armature 54 is attracted to its magnet, and thus pull the lower clutch-teeth of the clutch 47 out of contact with the upper teeth. The catch 109 is so adjusted with reference to the lower flange of drum 39 and the lower flange of collar 50 that the collar is separated from the drum before the catch begins to depress the drum. The object of this is to permit the drum 39 to revolve under the tension of the cord 8 8' more freely than it would do if in contact with the collar 50.

The electrical connections of the magnets X' and Y' and M' and N', (see Fig. 13ª,) by which the action of the power derived from the motor upon the receiving-pen is controlled, are as follows: In each of the reversing-circuits $d$ $e$ is a polarized relay J J', the armature of which vibrates between stops 19 and 20 and serves as a switch to direct the current of a local battery into one or the other of two local circuits and thus control the action of the weight-magnets. The stop 20 is connected by a wire $m$ with magnet-weight M', a part of the circuit being flexible to permit movement of the weight without disarranging the connection, the circuit thence passing through wire $m'$, part of this wire also being flexible, to contact-spring 51, collar 50, mounted on shaft 30, coil of magnet Y', shaft 30, to which the other end of the coil of magnet Y' is connected, contact-spring 24, wire $o$, local battery $o'$, armature 52 of magnet J'. Stop 19 is connected by wire $n$, part of which is flexible, with the coils of weight-magnet N', the circuit thence passing through wire $n'$, part of which also is flexible, to contact-brush 53, bearing upon a collar 31, with which one end of the coil of magnet X' is connected, the other end of which coil is in contact with the shaft 30, and thence through the connections before described with battery $o'$ and armature 52. A short circuit is provided from the wire $m'$ by wires $m''$ around magnet Y' to the common return-wire $o$, this short-circuit path being provided with a circuit-breaker 55, normally open. A similar short-circuit path is provided from the wire $n'$ by wires $n''$, and this path is provided with a normally-open circuit-breaker 56, these circuit-breakers 55 and 56 being located, respectively, in the paths of the magnet-weights N' M'. When the current passing through magnet J' is such that the armature 52 is held against the stop 20, it will be seen that the current of battery $o'$ will traverse the coils of weight-magnet M' and clutch-magnet Y'. The consequent energization of the core and shell of magnet M' will cause its rod 15 to grip the cord 8. Its weight will thus be thrown upon the cord 8, the magnet X' being in this position of the parts cut out of circuit, and the drum 39, to which the cord is fastened, will be given a tendency to rotate in the direction reverse to that indicated by the arrow in Fig. 14. This tendency will be resisted by the engagement of the escapement-pallets 105 with the teeth of the escape-wheel 26, except as revolution is permitted by the pulsations sent over line through the main circuit $c$, which traverses the coils of magnet H'. Each pulsation will cause the escapement-pallet to vibrate and permit the drum to rotate a distance corresponding to one-half a tooth of the escape-wheel. Meanwhile the clutch-magnet Y' attracts its armature 28, causing the latter to revolve with it and with the shaft 30 and to wind up the cord 9', to which the weight N' is attached, thus raising the latter magnet-weight. The magnet-weight M' will continue to descend and the magnet-weight N' to ascend, and the drum 39 will continue to revolve in the direction reverse to that of the arrow until reversal occurs in the polarity of the current upon the reversing-circuit $e$, and consequently a change in the position of the armature 52 of magnet J'. When this change occurs, the current of battery $o'$ will be shifted to the circuit $n$, passing through magnet N' and clutch-magnet X'. Magnet-weight M' will loosen its grip upon the cord 8, and at the same time clutch-magnet Y' will release its armature and clutch-magnet N' will be free to fall. Almost simultaneously, however, and before either of the weight-magnets M' N' can appreciably descend, the clutch-magnet X' is energized, grips its armature 29, and arrests the descent of and begins to elevate the weight-magnet M', while at the same moment the weight-magnet N' grips the cord 8 and carries it downward with it, giving the drum 39 a tendency to revolve in the direction indicated by the arrow. The function of the circuit-breakers 55 56 is to prevent the magnet-weights from being raised too high by the armatures of the corresponding clutch-magnets. When either of the magnet-weights, as N', comes in contact with the spring of its circuit-breaker 55, it closes the short circuit around clutch-magnet Y' at that point, thus de-energizing that magnet. The weight-magnet N' now begins to drop; but as soon as it has dropped far enough to open the short circuit the clutch-magnet Y' is again energized and raises it until the short circuit is again closed. The magnet-weight continues to vibrate thus until the electrical connections are reversed and it is allowed to descend, gripping the cord 8.

In the construction shown each weight is an electro-magnet, and nothing more. It is, however, obvious that the magnetic clutch might be a mere attachment to the weight.

The operation of the mechanism thus far described will now be stated. The motor-shaft 96, being continually in rotation while a message is being received, gives constant rotation to the shaft 30. When one or the other of the weight-magnets M' N' is energized, it pulls downward on the cord 8, causing a tension upon the drum 94, giving it a tendency to revolve in one direction or the other, as the case may be. This tendency to revolve will, however, be held in restraint when the line-current is on by the engagement of the escapement-pallet 105 with the teeth of the escape-wheel 26, except when the armature 99, carrying the pallets, oscillates. The pulsations of successively opposite polarity sent to line from the transmitter cause a change of magnetic polarity in the poles within the two coils of magnets H′, causing the armature 99 to be drawn first to one side and then to the other, giving an oscillating motion to the pallets, causing the restraint upon the receiving-pen to be suspended at regular successive intervals, and permitting the escape-wheel to revolve step by step, one step for each pulsation, in the direction in which the constant strain of the weight impels it. When a reversal occurs in the direction of motion of the transmitting-pen, the polarity of the current in the reversing-circuit is changed, the armature of magnet J′ responds to this change, and the condition of the electrical connections controlling the weight-magnet is reversed, so that the pen-drum 94 is given a tendency to reverse its direction of revolution and the direction of movement which it imparts to the pen-carrying arm 21, and motion in this reverse direction will continue until another reversal of polarity occurs in the reversing-circuit.

On referring to Fig. 14 it will be seen that when the transmitting-pen is moving in the direction indicated by arrow numbered 2 the current in the reversing-circuit $e$ will be the negative current of battery $f$ and such as to cause the armature 52 of magnet J′ to throw its armature against stop 19, closing the circuit of battery $o'$ through weight-magnet N′ and clutch-magnet X′, causing the drum 94 on the left-hand side of the instrument to revolve in the direction of the arrow, Fig. 14, magnet X′ at the same time being occupied in raising magnet M′. Upon reversal in the direction of movement of the transmitting-pen with reference to interrupter C the positive current of battery $f'$ is thrown upon circuit $e$, the armature of magnet J′ is shifted, weight-magnet N′ is de-energized, and weight-magnet M′ energized, and the drum 94 on the left-hand side of the receiving-instrument begins to rotate in a direction opposite to that indicated by the arrow in Fig. 14. The main circuit $b$ being also provided with a polarized magnet H, similar to polarized magnet H′, and the reversing-circuit $d$ being provided with magnet J, similar to magnet J′ and other connections and mechanisms similar to those above described, the effect of the ordinary pulsations upon the main line $b$ and reversal of current upon the reversing-line $d$ upon the pen-carrying arm 22, operated from the other pen-driving drum 94, is the same as that which has just been above described with reference to main line $c$ and reversing-line $e$ and pen-carrying arm 21.

It has now been explained how the movement of the transmitting-pen in a direction to or from either of the interrupters B C will cause the receiving-pen to move in the same direction, the movement of the latter pen being made up of a series of short steps. It is apparent that, as with the system described in my former patents, any movement of the transmitting-pen in a direction intermediate between these two directions will cause the receiving-pen to move in a corresponding direction, but with a movement made up of a number of steps taken at right angles to or crosswise of each other, the relative number of steps in each direction depending upon the obliquity of the movement of the transmitting-pen. The receiving-pen is thus caused to substantially follow any movement of the transmitting-pen and thus reproduce a substantial fac-simile of whatever is written or traced by the latter. The use of the escapement accurately defines the length of each step of the receiving-instrument, and, in connection with the equality in radial distance between the pens and the pivotal points of the cords and arms at the transmitting and receiving stations, respectively, which I now secure, insures the substantially accurate reproduction at the receiving-station of the writing of the sender.

The mechanism for causing the receiving-pen to be raised and lowered in accordance with the position of the transmitting-pen will now be described.

In two-line systems I have effected the raising and lowering of the pen at the receiving-station by changes of condition in the current traversing the main lines, and such means may be used in the present organization, if desired. I find it simpler and preferable, however, to employ changes of condition in the current traversing the reversing circuits, and for that purpose the resistances R R′ are introduced into the reversing-circuits $d$ $e$, respectively, and I make use of the changes of strength in the currents over these circuits caused by shunting these resistances in and out to operate the pen-lifting mechanism of the receiver. Both the transmitting and receiving pens in my preferred form of instrument rest, when in operation, upon a single platen 117, (see Fig. 2,) which in turn rests upon a spring-supported pivoted plate 118, one end of which in its normal (elevated) position makes contact with a contact-point 120, but when depressed by the pressure of the transmitting-pen in writing swings on its pivot so as to break contact with contact-point 120. Plate 118 carries an insulated contact-point 78, which, as it comes downward is brought into contact with a stationary contact-point 119, thereby closing a shunt-circuit for the current traversing the reversing-circuit $d$ around the resistance R. The breaking of contact between the plate 118 and the contact-point 120 opens a short circuit for the current traversing the reversing-circuit e around resistance R'. The depression of the platen by the transmitting-pen in writing thus increases the current strength upon the reversing-circuit d and diminishes the current-strength upon the reversing-circuit e. In the circuits d and e, respectively, are placed at the receiving end of the line two relays P P'. The resistances R R' are so adjusted with reference to the strength of the retracting-springs for the armatures of these relays that these armatures are attracted only when the resistances are cut out of circuit. The effect, therefore, of placing the transmitting-pen upon the paper will be to cause the relay P to attract its armature and the relay P' to release its armature, and the effect of raising the pen from the paper will be to cause the relay P to release its armature and the relay P' to attract its armature.

The receiving-pen is raised and lowered by means of two magnets S T, placed one above the other, and a local battery $y$. (See Figs. 2 and 14.) The armature 129, which carries the pen-rest 130, is located between the two magnets S T, and is operated upon by both of them. This armature is held or steadied in the position to which it is thrown by the attraction of one or the other of the magnets by friction-springs 43, the spring 131 serving merely to balance the weight of the pen-rest and armature. The circuit of magnet S passes through wires $s$, coils $v$ of paper-shifting magnet V, battery $y$, front stop 134 of relay P', and its armature 133 and wire $s$. The circuit of magnet T passes through wires $t$, (some of these wires, being common to circuits $t$ and $s$, are marked with both letters, and other local circuits having wires in common are lettered in the drawings in the same manner,) coils $v'$ of paper-shifting magnet V, thence by wires $s\ t$ to battery $y$, and thence by wires $s\ t$ to front stop 128 of armature 132 of relay P, that armature and wire $t$ to magnet T. The cutting out of the resistance R in circuit $d$, caused by the pressure of the transmitting-pen upon the writing-platen 117, causes the relay P at the receiving end to attract its armature and thereby close the circuit through the wires $t$ and pen-lowering magnet T, causing the armature 129 and the pen-rest 130 carried by it to be depressed and the pen G to descend to its writing position upon the paper, where it will remain until the sending operator raises the transmitting-pen and removes the pressure from the platen 117. The support 118 will then rise, cutting the resistance R again into the circuit $d$ and cutting resistance R' out of the circuit $e$, causing the relay P to release its armature and the relay P' to attract its armature. The circuit through the magnet T is thus broken, circuit completed through the magnet S, causing the armature 129 and the pen-rest carried by it to be raised, lifting the pen G from the paper; and these parts will remain in this position until the transmitting operator again depresses his writing-platen. While these operations are in progress the paper-shifting magnet V is inactive, although both the circuits $s\ t$ pass through certain of its coils. This inactivity results from the fact that the magnet V is of the peculiar construction known as a "consequent-pole" magnet. It is made up of two soft-iron rods of any convenient length 135 136, (see Figs. 4 and 8,) and upon the ends of these rods are wound helices of the usual construction, spaces being left at the centers of the two rods, between the helices, of sufficient width to receive an ordinary armature. At these points it is convenient to place pole-pieces 137 138, which extend outward beyond the contour of the coils in such position as to conveniently act upon an armature 139, trunnioned in the ordinary manner. The soft-iron rods 135 136 are united at their ends by soft-iron heel-pieces 151 152, so that there is a continuous ring of iron. When only one of the two sets of coils $v\ v'$ is in circuit, the magnetic circuit of the magnet V is closed through the heel-iron opposite to the excited coils and no magnetism of consequence is developed in the points 137 138. It results that when either of the circuits $s\ t$ are separately closed sufficient magnetism is not developed in magnet V to cause it to attract its armature. When, however, both of these sets of coils $v\ v'$ are simultaneously energized by a current flowing in opposite directions, polarity will be developed in the points 137 138 and the armature 139 will be attracted. The connections of circuits $s\ t$ are such that the current of battery $y$ flows through the two sets of coils $v\ v'$ in opposite directions when these circuits are closed, so that it is only necessary, in order to cause the magnet V to become active, to simultaneously close these two local circuits. The armature 139 has a play limited by stops 140 141, and has a shoulder 142, which serves as the trigger of an escapement controlling the feed of the paper.

My present invention embraces some improvements in paper-shifting devices, which will now be described. The blank paper is wound upon a drum 2, preferably of wood, and adapted to be fitted upon the shaft 7, mounted in bearings 5 6, depending from the table top of the machine or otherwise suitably placed. The paper-roll is applied to the shaft by first removing one of the bearings, as 5, for that purpose and then pushing the drum 2 onto the shaft. The shaft is provided with a spur-disk 3 keyed upon it, which by its engagement with the drum 2 prevents the latter from revolving. The paper passes from the spool over the friction-roll 25 along the top of the writing-platen 117 to the feeding-rolls 143 144. These rolls are so arranged as to give a positive feed by nipping the paper between them and pulling it forward at each release of the feeding-escapement. The upper roll 144 is slightly movable vertically in its bearings, and is pressed downward by springs 220, Fig. 1, so that it grips the paper with a flexible pressure against the surface of the roller 143. The roller 143 has fast upon its shaft 145 a pinion 146, which meshes with another pinion 147 fast upon a shaft 148', to which is attached a weighted drum 149'. The drum is not rigidly fast upon the shaft 148', but is attached thereto by the common pawl-and-ratchet device 150, so that the weight may be wound up without disturbing the position of the feed-rollers. Fast upon the shaft 145 is another pinion 153, which meshes with a pinion 154, mounted upon the shaft 155, carrying the two-armed escapement 108, the two arms 148 149 of which are so placed as to engage with the shoulder 142, formed upon the armature-lever 139. The arms are not placed opposite each other, the arm 148 being at such a distance from the magnet that it will engage with the shoulder 142 when the armature 139 is against its front stop and the arm 149 being so placed that it will engage with the shoulder 142 when the armature 139 is against its back-stop. (See detached view to the right of Fig. 4.) The weight gives the feeding-rolls a tendency to revolve and feed the paper, which is checked by the engagement of the arm 149 with the shoulder 142 when the armature 139 is against its back-stop. Upon each energization of both sets of the coils of the magnet V and consequent attraction of the armature 139 arm 149 is released and the escapement 108 revolves, permitting feed of the paper. If the attraction of the armature 139 is instantaneous only, it will drop back against its back-stop before it is touched by arm 148 and will be in a position to arrest the arm 149 at the end of a complete revolution of the escapement. If, however, the energization of magnet V continues long enough the arm 148 will find the armature 139 in its path and will be arrested by the shoulder 142, the escapement making only half of a revolution. Upon the next de-energization of one or both sets of coils of the magnet V the armature 139 drops back, releasing the arm 148 and assuming a position against its back-stop, where it will arrest the arm 149 at the end of another half-revolution. This device insures a certain definite feed of the paper, corresponding to one complete revolution of the escapement for each complete movement to and from its magnet of the armature 139 without regard to the length of time for which the armature is held against its front stop. The operator can, therefore, cause the exact amount of paper required to be fed, the amount depending upon the number of times he operates his paper-shifting lever. The several gears connecting the escapement 108 with the paper-feed rolls are preferably so adjusted in size that the feed corresponding to one revolution of the escapement is sufficient to move the paper a distance equal to the space properly left between two lines of writing. It will be observed that this feeding device secures a feed which is independent of the amount of paper on the roll and consequently that the successive spaces of feed corresponding to one revolution of the escapement are uniform.

To provide that the paper shall always lie flat upon the platen and shall not be subjected to the liability of wrinkles or looseness due to changes in temperature, moisture, or other causes, I propose to employ a tension device which shall throw a constant strain upon the paper passing over the platen. Various forms of such a device may be readily suggested. One which I find to be serviceable consists of a lever 157, (see Figs. 2 and 3,) provided with an adjustable clamp 158, by which it is attached to the shaft 7 and clamped thereon, so as to bind the shaft with a considerable degree of friction. Two stops 159 161, one of them preferably adjustable, are provided for the lever, and the spring 162 connects its ends with the frame-work of the instrument. This spring tends to pull the lever in a direction opposite to that in which the paper is drawn by the feed-rolls. As the paper feeds, the pull upon it is sufficient to overcome the friction between the clamp and shaft 7, the shaft revolving in the clamp; but when the feed of the paper ceases the friction of the clamp upon the shaft is sufficient to cause the shaft to be rotated backward by the stress of spring 162 to such an extent as to take all the slack out of the paper lying upon the platen. The means provided at the transmitter for causing the simultaneous closing of the two local circuits $s\ t$ at the receiving-station, and thus effecting the feed of the paper, consists of circuit connections whereby currents effective to energize both the relays P P' are simultaneously sent over both of the reversing-circuits $d\ e$. It is necessary that these impulses should be sent to line independently of the position of the writing-platen, and that this may be done I provide a switch in each of the reversing-circuits between the resistances R R' and the distant station and a shunt-wire for each of these circuits from the batteries $g$ and $f'$, respectively, around the resistances R R'. An upright shaft 100 is journaled (see Figs. 3, 6, and 14) in the table, and carries on its upper end an arm 101 and on its lower end a circular block 102, of insulating material, having upon it two pairs of similar contact-pieces 103 205 103' 205', one pair only of which is fully shown in the drawings. Upon each of these sets bear two pairs of contact-springs 106 107, connected to the circuit $d$, and 106' 107', connected to the circuit $e$. Plate 205 is connected by wire $a$ with the circuit of battery $g$ between that battery and its contact-point 87, while plate 205' is connected by wire $h$ with the circuit of battery $f'$ between that battery and its contact-point 88'. From these connections it results that when the lever 101 is pushed to the left contact-springs 106 107, 106' 107' drop off the plates 103 103', respectively, and the two reversing-circuits $d\ e$ are each broken; but immediately thereafter, when the springs 106 106' come in contact with plates 205 205', respectively, the circuit of battery $g$ is closed by way of the wire $a$ through circuit $d$, and the circuit of battery $f'$ is closed by way of the wire $h$ through line-wire $e$. The full force of each of the reversing line-batteries is thus simultaneously thrown to line, and relays P P' both attract their armatures, closing the circuits $s\ t$ and actuating the paper-shifting magnet. When, therefore, the transmitting operator desires to shift the paper at the distant station, he has only to carry his pen to the upper left-hand corner of its field and press the part just above the pen-nib against the arm 101. This operation does not affect the pen-rest, since the two magnets S T neutralize each other in their effect upon their common armatures.

It is obvious that to enable the receiving-instrument to reproduce characters traced by the transmitting-pen the direction of motion of the receiving-pen must accord with that of the transmitting-pen, and to secure an exact reproduction it is necessary that the length of the cords connecting the transmitting-pen with the hinging-points on the interrupter-drums should be exactly equal to the lengths of the corresponding pen-arms of the receiving-instrument; or, in other words, in order to secure perfect results, it is necessary to start the two instruments in unison and keep them in that relative condition. I have devised means for bringing the transmitting and receiving instruments into unison when they are not so, and will now describe it and its operation.

Armature 139 of the paper-shifting magnet controls a local circuit, which has not yet been mentioned. This circuit $q$ (see Fig. 14) includes the coils of magnets O O', the two batteries $z\ z'$, and the armature 139, and a contact-stop 112. When the paper-shifting magnet is energized and the armature 139 drawn up this circuit is closed, energizing the two magnets O O', causing them to attract their armatures 54 and depress the collars 50 (see Fig. 11) against the pressure of springs 49, causing the clutches 47 to open and disconnecting the pen-drums 94 from the escapement-wheels. The pen-drum is therefore left free to revolve under the influence of that one of the weight-magnets M' or N' which is operating upon it at the time, and the pen will therefore be suddenly driven in the direction of movement corresponding to that weight to the limit of its motion in that direction. Both of the pen-drums 94 being simultaneously freed from restraint in this manner the pen will swing forward at once in its two directions. The connections of wires $a\ h$ with the batteries $g\ f'$ are such that the currents sent over lines $d\ e$, respectively, upon the shifting of the paper are normal for that position of the transmitter, causing a tendency of the receiving-pen to move toward a position corresponding to that of the transmitting-pen while the latter is operating upon the switch-lever 101—that is, to a position at the upper left-hand corner of the receiving-field. At this point it will be arrested by knots 167 160, properly placed in the endless cord 8 8', coming in contact with a fixed stop. This fixed stop in this case consists of adjustable cross-pieces 110 111, through holes in which the cords 8 8' pass. (See Fig. 13ª.) It will thus be seen that if the receiving-pen was before in advance of the transmitting-pen it will be overtaken at its extreme point of motion by the transmitting-pen at the moment of shifting the paper, and if the receiving-pen was behind the transmitting-pen it will overtake the latter at the same point. Complete provision is therefore made for securing unison between the two pens whenever desired by the transmitting operator.

I do not confine myself in this application to any particular form of unison device, provided such device be adapted to perform the desired function. I wish, however, to call attention to the superiority of that organization wherein the reversal of the direction of motion of the receiving-pen depends upon a change of polarity in the governing-circuits, since in such case it is only necessary to provide for bringing the two pens into unison as regards amount of motion, it being always certain that their direction of motion is the same. My unison mechanism shown in this application is therefore less complicated than the mechanism shown in my previous applications above referred to, which are required to perform the function of unifying the direction as well as the amount of motion of the two pens.

The provision for shifting the paper at the transmitting-instrument from the transmitting end consists of suitable connections between the paper shifting or unison switch and the battery $y$ at the transmitting-station, whereby upon the throw of the switch the two circuits $s\ t$ are closed through the paper-shifting magnet at the transmitting-station. Such connections are shown in Figs. 13 and 13ª. A wire $r$ passes from the battery $y$ to a contact-plate 163 on the block 102 of the unison-switch. Located in relation to this plate, so that they will come in contact with it when the switch is shifted, are two circuit-making springs 164 and 165, connected by wires $r'\ r''$, respectively, with circuits $s\ t$ at the receiving-station. By means of these connections on the shifting of the unison-switch the current of battery $y$ at the receiving-station is divided at the brushes 164 165, and a portion of it passes through each set of coils $v\ v'$ of the paper-shifting magnet, effecting the paper-feed at the home station. The paper is thus simultaneously shifted at the sending and receiving stations.

It remains to describe the motor-circuit and the manner of its control. The circuit of the motor is normally closed through wires $i$ with a local battery. In order that the circuit of the motor may be broken when the instruments are not in use, if desired, it is provided with a circuit-breaker of any suitable construction, the form shown in this case being a block 198, partly of metallic and partly of insulating material, having a spring 197 riding upon it. This circuit maker and breaker is controlled by an ordinary single-spool electro-magnet L, connected by wires $w$ with both of the circuits $s\ t$ in such manner that it will be in a branch circuit from battery $y$ whenever the circuit of that battery is closed through the front stop and lever of either of the relays P P'. Magnet L has an armature-lever 199 trunnioned upon double pivots, so as to move to and from the magnet and also sidewise in either direction, as shown in Figs. 9 and 10. The magnet L and its armature 199 are so placed with reference to the shaft 30 that a pin 200, fixed to the outer end of the armature will engage, when the armature is released by its magnet, with a screw 201 carried by the shaft. The armature 199 is drawn back from its magnet by spring 202 in the ordinary manner, and is also provided with a side stop 203, against which it is normally held by a spring 204, this spring 204 putting a strain upon the armature-lever 199 in a direction opposite to the direction in which it is carried by the engagement of the screw 201 with the pin 200. The contact-spring 197 is attached to the armature 199 and rides upon the metallic portion of the block 198 when the armature 199 is against the side stop 203, and the width of this metallic portion of the block 198 is such that the spring 197 will continue to rest upon it as it is moved away from the stop 203 during the time occupied by a number of revolutions of the shaft 30. The resistance of the magnet L is made high, and it is so adjusted that it requires but a small fraction of the current of battery $y$ to cause it to attract its armature. When, therefore, either of the relays P or P' are energized and their armatures rest upon their front contacts, the magnet L will be energized, the pin 200 on its armature will be held out of engagement with the screw 201, and the spring 204 will hold it in contact with the stop 203, the spring 197 will rest upon the metallic portion of the block 198, and the circuit of the motor will be closed. If, however, both of the relays P P' are de-energized and both branches of the circuit of magnet L in consequence thereof are broken, the magnet will release its armature, pin 200 will engage with screw 201 and be carried away from the stop 203 against the tension of the spring 204 as the shaft 30 rotates, so that if the break in the two main-line circuits continues long enough the spring 197 will be carried out of contact with the metallic portion of the block 198 and the motor-circuit will be broken, causing the motor to stop. It results that when full current is on either of the lines $d\ e$, causing the armature of either of the relays P P' to be attracted, the circuit of the motor-battery will be closed through the motor; but when there is an effective current in neither reversing-line circuit the motor-circuit will be broken and the motor will stop after a few revolutions of the shaft 30. The spring 197 is so adjusted with reference to the metallic portion of the block 198 that the circuit of the motor will not be broken in bringing the transmitting and receiving pens to unison under ordinary circumstances; or, in other words, unison will be reached before the spring 197 is carried off from the metal portion of the block 198.

The system has now been fully described, considered as a system embracing but two instruments, one at the sending and one at the receiving station. In practice it is desirable to employ a sending and a receiving instrument at each station adapted to be connected to one cable of wires connecting stations, and to this end a switch may be employed, as described in my former patents and applications. My present invention includes improved switches for this purpose, combined with a pen-rack, (though they may be otherwise placed.) This switch also performs a further function which will be described. The connections of this switch are shown in Fig. 13 and the switch itself is illustrated in Figs. 3 and 5. This switch consists of a vertical shaft 169, mounted so as to revolve freely in the table and carrying at its upper end an arm 170, provided with two forks or rests 171 172 adapted to receive the upper portion of the transmitting pen. The pen is provided at its upper end with a weighted knob 173, by which its equilibrium is maintained upon the rests, or the rear fork 171 may be provided with a hook. To the lower end of the vertical shaft 169 is attached a circular block 174, upon which bear four sets of contact-springs. Two sets of these springs 175, 176, and 177, and 175', 176', and 177' are appropriated to the main-line circuits respectively. The circuit-wire $b$ coming in from the distant station connects with spring 176 and rests, when the instrument is in the receiving position, (this being the position shown in Fig. 13,) upon the contact-plate 178, (see Fig. 5,) being thereby in electrical contact with plate 178 and spring 177, from which the circuit passes to the magnet H of the home station and ground. When the instrument is being used as a transmitter, the position of the block 174 will be shifted, as hereinafter explained, the springs 176 and 175 will rest upon the block 179, spring 177 resting upon the insulating material of the block 174. Main-line wire $b$ will then be in electrical contact with the interrupter B of the home instrument. The connections of main line $c$ with springs 175', 176', and 177', and a similar set of contact-plates and circuits are precisely the same as that which has just been described with reference to line $b$. The other two sets of contact-springs resting upon the block 174 are lettered, respectively, 180, 181, 182, 183, and 180', 181', 182', and 183'. (See Figs. 5 and 13.) Reversing-line $d$ coming from the distant station connects with switch 183 and rests when the instrument is in position to receive upon the plate 184, upon which also rests in such position spring 180. This latter spring is in electrical connection with magnets J P at the home station. In the reversed position of the switch—that is, when set for transmitting—springs 182 and 183 rest upon recessed plate 185, while springs 181 180 rest upon the insulating portion of the block 174. Spring 182 is in electrical connection through the unison or paper shifting switches and resistance R with the switch-arm 86 of interrupter B, so that the current of batteries $g$ $g'$ passes directly through springs 182 and 183 to line $d$. The spring 181 is never in electrical contact with either of plates 184 and 185. Its purpose and connections will be presently stated. Springs 180' 181' 182' 183' are provided with contact-plates upon block 174 precisely like 184 185, and the circuit connections of line-wire $e$ with those springs and plates and the other parts of the instrument duplicate those of line-wire $d$ with the corresponding parts which have just been described. The pen-rack switch is arranged to be moved automatically in the following manner: It is provided with a rear extension 187, (see Fig. 13,) which plays between two rear stops 188 and 189, being given a tendency toward the transmitting position by a spring 190. Connected with the arm 187 is a dash-pot 191, which acts to cause the motion of the switch toward the position of "receive" to be slow, while it does not act to retard the transition of the switch to the position of "send." The spring 190 is so adjusted with reference to the springs 70 of the interrupters that when the pen is placed in the rack the springs of the interrupters acting upon the point of the pen will draw the pen-rack around against the tension of spring 190, so shifting it from the position in which it is otherwise held by spring 190 or the transmitting position to the receiving position shown in Fig. 13.

The operator, when he has finished using the transmitting-pen, will place it in the rack, and will thereby swing the system from "send" to "receive," and the position of the pen in the rack will indicate at a glance that the system is set for receiving and afford a check against carelessness on the part of the operator. The function of this pen-rack is therefore the same substantially as that of the rack shown in my former patents, with an additional function which I will hereinafter refer to. When the pen is taken from the rack for the purpose of transmitting a message, the action of the spring 190 automatically returns the switch to transmitting position and completes the transmitting-circuits. It will be observed that with this organization, when the transmitting-pens at both ends of the line-wire are hung up both of the stronger line-batteries Z Z' will be cut out and only the two small batteries $z$ $z'$ will be on line, and these batteries being opposed in polarity will neutralize each other, and the condition of the line will be equivalent to that of having no battery in circuit; also, batteries $g$ $g'$ and $ff'$ at both stations will be cut out of circuit. It follows from this construction that when the transmitting-pen is placed in the rack the relays P P' of the distant receiver will both be de-energized and the motor at this distant station will be brought to rest after a few revolutions of its shaft 96, and that when both transmitting-pens are placed in their racks, there being no effective current on line, both motors will come to rest. If now one of the transmitting-pens is taken from its rack, it will cut in the batteries Z Z' at the transmitting end through the agency of the pen-rack switch, and at the same time by throwing the current upon the reversing-lines it will close one of the relays at the distant end and start up the motor, which will remain in operation until the message is completed and the pen again hung up. This organization gives the transmitting operator the full control of the motor, as well as of all the rest of the machinery at the receiving end.

As already stated, a single platen is used for the transmitting and receiving pens. In the organizations shown in my prior patents and applications I have proposed to use a separate platen for the receiving and transmitting pens at the same station. As, however, the two pens at the same station are never used simultaneously, it is possible to employ a single platen for both, thus simplifying the instrument and reducing the space occupied by it. The spring which supports the platen is made of such tension that it does not yield to the very inconsiderable pressure of the receiving-pen when recording a message, but does yield to the ordinary pressure put upon the transmitting-pen. The center line of the transmitting-field is shown in Fig. 1 by the broken line D and the center line of the receiving-field by the broken line D'. The lower boundary of the transmitting-field is indicated by the broken line D'' and its upper boundary by the broken line D'. The lower boundary of the receiving-field is indicated by the broken line D and its upper boundary by the broken line D'''. The transmitting and receiving fields therefore overlap. The position of the transmitting-pen, however, when in its rack, is sufficiently above the paper to permit the receiving-pen to pass freely beneath it and its cords 63 64. In order that the receiving-pen may not be in the way of the transmitting-pen when the latter is in use, provision is made for causing the receiving-pen to be drawn back from its writing-field when not in use. The springs 181 and 181', bearing upon the switch-block 174 and the plates 57, (see Fig. 5,) are provided for this purpose. Spring 181 is connected with the battery $g'$ by a wire $j$, which joins the wire connecting that battery with contact-stop 88, so that when springs 181 and 183 are both upon plate 57 a circuit will pass from battery $g'$ over wire $j$ springs 181 and 183 to reversing-circuit $d$ and the distant instrument. Spring 181' is in like manner connected with battery $f'$ by a wire $k$, which joins the wire connecting that battery with its contact-point 88'. Block 174 is provided with another contact-plate similarly placed to plate 57, (not shown in drawings,) which is adapted to bring spring 181' in contact with spring 183' in the proper position of the block 174, thus causing a current to pass to the reversing-circuit $e$ from battery $f'$. The plates 57 are so placed upon the block 174 that immediately after the transmitting-pen has been placed in the rack—that is, during the movement of the block 174 under the pressure of springs 70, overcoming the tension of spring 190—springs 181 and 183 and 181' and 183' are, respectively, brought into electrical connection for a brief interval, resulting in the passage to line of two electrical impulses over circuits $e$ $d$. Since these currents do not pass through the resistances R R', they so energize both the magnets P P' as to cause them to attract their armatures, as well as operate the armatures of magnets J J'. Consequently the circuit of O O' is closed and the two escapements disconnected from the two pen-drums 94, and the receiving-pen is free to run without restraint in the direction in which it is urged by the magnet-weights operating upon the two pen-drums, respectively. It will be noticed that the connections are such as to give a positive electrical impulse in both the lines $d$ and $e$, so that the armatures of magnets J J' are so set thereby as to cause both of the receiving-pen arms 21 22 to be retracted, and the receiving-pen, therefore, to move backward in the central longitudinal line of the paper strip. In order that this motion may have some duration, the dash-pot 191 is attached to the arm 187, projecting from the block 174, causing a retardation in the movement of the switch from the transmitting to the receiving position. The springs 181 183 are therefore in electrical contact long enough to permit the receiving-pen to run back to a position indicated by the letter $l$ in Fig. 1, where it is stopped by the contact of knots 156 160 with their stops, and rests while not in use. Consequently whenever the transmitting operator places his pen in the rack he thereby causes the receiving-pen at the distant station to take up the position $l$, where it remains until he again takes the transmitting-pen out of the rack to send a message.

It will be observed that the position of the receiving-pen at $l$ corresponds in some degree to the position of the receiving-pen at the unison-point. In both cases the arm 21 is retracted to its extreme position while the arm 22 is in its extreme protracted position at the unison-point. When the pen is at the point $l$, the arm 21 remains in its extreme retracted position, and the arm 22 is also in its extreme retracted position. The stops and knots upon the cords, by which the receiving-pen is arrested at these positions, are not essential to the apparatus, but are useful because they serve to take the strain of sudden stopping off from more delicate parts of the apparatus. Thus the pen might be stopped at both of these positions by reason of the fact that each of the drums 94 had come to the end of its cord 93, so that on that account its pen-arm could move no farther in that direction; but this would necessitate stronger cords and pen-arms than it is convenient to make. So, also, stops might be applied to other parts of the apparatus—as, for instance, to the pen-arms themselves. It will, however, be seen that stops independent of the other parts of the instrument are not essential thereto either for unison or for causing the receiving-pen to take up its positions at $l$.

When the operator desires to send a message, he removes his pen from the rack and first moves it slightly to and fro near the point at which the nib rests while the pen is in the rack, in order to make sure that the weights at the distant station are wound up, and then carries his pen to unison. This causes the receiving-pen at the distant station to instantly follow to its unison position. The operation of the unison-switch also shifts the paper at both stations, and the two instruments are therefore ready for the transmission of the message. The overlapping position of the transmitting and receiving fields makes it possible to use the instrument for sending and receiving alternately with a very slight movement of the paper between the two operations. Consequently the button by means of which the operator shifts his own paper after sending a message without changing the position of the paper at the distant station, (shown in my above-mentioned prior application) is not essential to my present organization, though it may be employed if thought desirable.

If the receiving-pen is allowed to rest upon the paper when not in use there is a liability that ink may escape from it and deface the paper and also that the ink may waste by evaporation, leaving deposits in the bore of the pen which interfere with the easy flow of the ink. To prevent such difficulties I propose to provide at the point $l$ a pen-support $p$, made of any hard or non-absorbent substance, preferably metal, and projecting across and a little above the strip of paper from a point of attachment to the table. The receiving-pen when in its retracted position rests upon this support, which closes the opening in the nib of the pen and prevents the escape of ink, at the same time protecting the paper beneath it. The support $p$ is of such a height that the nib of the pen will run upon it and it rises slightly from its edge to its flat top, so that the pen will be raised by it from the pen-rest and will be supported by it and thereby the closing of the bore of the pen be secured.

I have devised a modified form of the weight-reversing system above described, which I consider in some respects a preferable form. In this modification there are, as before, weights provided with magnetic clutches and two pairs of clutch-magnets X Y X' Y'; but these clutches are so constructed that a single magnet-coil performs the function of a magnetic clutch for determining the connection of the weights with the receiving-pen and that of a magnetic clutch for connecting the weight to the motor-shaft, so as to cause it to be wound up. Referring to Fig. 15, I will now describe one of these clutch-magnets and associated parts, all being duplicates of each other in the four sets used. The core 27 has at one end a chamber 44 and at the other end an extension 45, about which is placed an insulating-bushing 58, which in turn carries a brass ring 59, which serves as a bearing for a contact-spring connecting with the magnet-coils. The usual non-magnetic disk 14 supports the soft-iron shell of the magnet 10 at its outer end, forming with the core, shell, and magnetizable disk 12 the inclosed space in which the coil is wound. Within the recess 44 is a stop 60, fast on the shaft, and between this and a second stop 61 is placed with a slight endwise play a brass sleeve 62, free to rotate upon the shaft and provided with friction-bearing 77. The preferred material for this bearing is vulcanized fiber treated with boiling paraffine-wax, which effects the elimination of all moisture and the filling of the pores of the fiber with paraffine, making a good bearing to run without lubrication. The sleeve 62 carries on its outer end a hard-rubber disk 80, and just within this a pulley 81 is journaled upon the sleeve, being also provided with a friction-bearing, preferably of the material above described. Between the pulley 81 and the end of the magnet is an iron disk 82, and united to it a hard-rubber disk 83, the two together forming a pulley and the disk 83 being provided with a pin 84, which passes into a short longitudinal slot 85 in the sleeve 62. The disks 82 83 are also provided with a friction-bearing upon sleeve 62 and have a slight longitudinal movement with reference to the sleeve, limited by contact with the magnet upon one side and pulley 81 upon the other. On the inner end of the sleeve 62 is fixed a collar 90, and between this collar and the face of the disk 82 is compressed a spring 196, which tends to force the disk out from the clutch-magnet. The soft-iron disk 82 serves as an armature for the magnet, and when the coils of the magnet are excited the disk is drawn up against the tension of spring 196 until it comes into contact with the end of shell 10 and core 27. In this position it is held fast and revolves with the magnet and shaft, carrying with it the sleeve 62, by reason of the engagement of the pin 84 therewith. The pulley 81 is now, however, unclamped, and is left free to revolve in either direction upon the sleeve 62. When there is no current passing through the coils of the clutch-magnet the disk 82 is pushed back by the spring 196 and clamps the pulley 81 between disks 80 and 83. The sleeve 62 and all parts mounted on it are then free to revolve in either direction, carrying with them the pulley 81. This may be considered the normal condition of these parts. These two clutch-magnets are placed facing each other upon a shaft 98, journaled in suitable bearings. For convenience it will be considered that the magnet above described is the left-hand magnet in Fig. 17, and I will apply the primes of the same numbers used for designating the various parts to the corresponding parts of the right-hand magnet. To each of the pulleys 81 81' is attached a cord 113 113', these cords passing to opposite sides of the drum 39 and being fastened thereto. To the opposite side of each of the pulleys 81 81' from that to which the cords 113 113' are respectively attached is fixed one end of a cord 114, (see Fig. 16,) which passes about an idle-wheel 115, which is journaled between the forks of the Y-shaped support 116, the shank of which passes through a bracket 121, and is held in position by a spring 122, resting at one end upon the bracket and at the other upon a nut 123 upon the end of the shank. This spring serves to keep the cords 114, 113, and 113' always under tension. Within the spring 122 and about the shank of the support 116 is a sleeve 124, which serves to prevent any possible simultaneous winding of both of the ends of the cord 114 upon the pulleys 81 81' by reason of the pulleys being simultaneously gripped between their respective disks 83 and 80 or by reason of friction between their bearings and sleeves 62. Should such double winding of the cords 114 begin, the spring 122 will be slightly compressed; but speedily the nut will come in contact with the lower end of the sleeve 124, preventing the further advance of the support 116, and consequently checking the double winding of the cords 114. To each of the disks 83 and in a groove formed for that purpose is fixed a cord 125, to the lower end of which is attached a weight 126. The shaft which carries the clutch-magnets is not made continuous in this construction with the shaft driven by the motor. It carries upon its inner end a soft-iron disk 127, which normally stands in close proximity to the ends of the core and shell of a clutch-magnet D, of substantially the construction shown in Fig. 9, this latter magnet being fast upon the motor-driven shaft 30, (the connection between the motor and the shaft in this case being shown as made by a worm-gearing.) The disk 127 is keyed on the shaft 98 and has a slight play endwise of the shaft to enable it to be drawn up against the ends of the magnet core and shell when the magnet is energized. The circuit connections are as follows: From the local battery $o'$ the current passes through wire $u$ and branches through wire $u'$, shaft 30, the coil of magnet D, one end of which is in electrical connection with shaft 30, brush 210, wire $u''$, circuit-breaking switch 211, plate 213, circuit-breaking switch 214, and wire $u'''$ to battery. The other branch of the circuit passes through the wire $x$ to shaft 98, where it again divides, to the coils of magnets X' Y', respectively, one end of each of which coils is in contact with the shaft 98. From the coil of magnet Y' the circuit passes through brush 215, wire $x'$ to stop 19 and armature 52 of the magnet J', and thence to battery. From the coil of the magnet X' the circuit passes through brush 216 and by wire $x''$ to stop 20 and armature 52 of magnet J', and thence to battery. The cords 125 125' pass, respectively, through the slotted ends of circuit-breaking springs 214 and 211 and are provided with protuberances 217 217', so placed as to come in contact with the ends of the springs 214 and 211, respectively, and raise the one or the other, as the case may be, out of contact with plate 213, thereby breaking the circuit of magnet D. It will be observed that this circuit is dependent upon the contact of both of these springs with plate 213, and consequently will be interrupted by the elevation of either of them. From these connections it is obvious that the circuit of the battery $o'$ will be closed through magnet D at all times except when the circuit is interrupted by one of the two protuberances 217 or 217' coming in contact with and raising one or the other of the springs 214 211, and that the circuit of the battery $o'$ will always be closed through one or the other, but not at the same time through both of the magnets X' Y', the position of the armature of magnet J determining which one of these clutch-magnets is energized. Therefore a reversal in the reversing-circuit $e$ will cause the current from the battery $o'$ to be shifted from one of the magnets X' Y' to the other. It will be observed that when either of these clutch-magnets is de-energized the whole structure mounted upon the sleeve 62, and which is then collectively rigid, will be revolved by its weight and give to the drum 39, through the medium of cord 113, a motion of revolution with it. It will also be observed that when either of these clutch-magnets is energized and attracts its armature-disk 82 it becomes active to elevate its weight 126, and its pulley 81 is meanwhile free to revolve, so as not to resist the tendency of the opposed weight to give motion to the drum 39. The operation of these devices is as follows: Supposing the current on the reversing-circuit to be of such polarity as to cause the armature of the magnet J to rest against stop 20, the circuit of battery $o'$ will pass through clutch-magnet X', clutch-magnet Y' being cut out of circuit. Pulley 81 will therefore be clutched fast to its sleeve 62 and will be rotated under the pull of weight 126, thereby giving a tendency to drum 39 to revolve in the direction indicated by the arrow in Fig. 17. The disk 83' of magnet X' will revolve with the magnet X' and wind up its weight 126'. The pulley 81 will be free to revolve in either direction upon the sleeve 62, and therefore will be drawn by the cord 113' so as to revolve toward the drum 39. As soon as the weight 126' is raised high enough to bring the stop 217' into contact with spring 211 and lift the latter off the plate 213 the circuit of magnet D will be broken, and it will release its armature-disk 127, and the rotation of the shaft 98 will cease, and consequently the upward motion of weight 126'. Weight 126' will now begin to drop, there being nothing to sustain it, and will drop far enough to again close the circuit of magnet D, when it will again be raised and will continue thus vibrating until the circuit connections are reversed and it is permitted to descend, giving motion to the pulley 81'. Change of polarity in the circuit $e$ consequent upon a reversal of the direction of motion of the transmitting-pen with reference to the interrupter C shifts the circuit of battery $o'$ to the clutch-magnet Y', cutting out magnet X'. The position of the parts as now reversed is as follows: The pulley 81', clutched to its sleeve 62, has become operative to give a motion to drum 39 in a direction opposite to that indicated by the arrow under the pull of of weight 126', the pulley 81 is unclamped and free to revolve, and the disk 83 and magnet Y' are performing the function of raising the weight 126. The unison-stops employed in this case are shown in Figs. 15 and 16, and consist of a pin or projection 225 from each of the pulleys 81 and a fixed stop 226, placed in the path of each of the pins 225. The total movement of the receiving-pen in each of its two crosswise directions corresponds to a movement of the corresponding pulley 81 a little less than an entire revolution, each pulley 81 being free to revolve in either direction until its pin 225 comes in contact with one side or the other of its stop 226.

In Fig. 18 I have shown a modified form of the pen-raising device, in which the magnets S and T, instead of being arranged one above the other, are placed side by side with the armature-lever 129 trunnioned in the ordinary manner between them. To one end of the armature—to wit, that in proximity to the magnet S—is attached the pen-rest. Energization of the magnet S by tilting the armature-lever 129 in one direction will therefore elevate the pen-rest, and energization of the magnet T by tilting the armature-lever 129 in the opposite direction will depress the pen-rest. I find this construction to be preferable to that first described.

Modifications may be made in most of the details of the system and still it will contain my invention. A few of the more general modifications which may be made will be referred to.

While I prefer to operate the governing reversible escapement-magnet by pulsations of successively opposite polarity, I do not confine myself to a system in which such pulsations are used. I have secured good results by merely making and breaking the line-circuit, as in the system described in my former patents, these impulses of like polarity operating a governing escapement-magnet of the ordinary type instead of a polarized escapement-magnet. In this case, of course, the pull of the magnet upon the armature in one direction would be opposed by the pull of the usual back spring in the other direction.

It is not essential that two line-batteries of unequal strength be employed, as the alternately positive and negative pulsations may be sent from the transmitting-station by means of a pole-changer operated or controlled by the interrupters or in any other suitable manner.

While I prefer an electric motor as a source of power for driving the receiving-pen or raising the weights, in that it is more readily controlled from the transmitting-station than other forms of prime motors, I do not limit myself to the use of such a motor, but may employ in its stead any convenient type of mechanical motor, or a weight, or a shaft rotated from any appropriate source of power; or I may omit the motor entirely from the machine, using hand-power to raise the weights.

It is to be understood that in this application, as in my former patents, the terms "character," "writing," and "message" as herein used include any matter—such as pictures, maps, drawings, diagrams, and arbitrary characters of all kinds, as well as ordinary and shorthand writing; also, that the term "paper" includes any surface suitable for writing or from which any writing or printing is to be traced. If, in addition to transmitting messages in writing, it should be desired to capacitate the mechanism to transmit and reproduce diagrams, maps, and pictures, all that is necessary is to allow the transmitting and receiving pens to have the necessary range of movement in each direction.

In some cases it may be preferred to write the message in the form of a single line extending along the length of a narrow ribbon of paper, as suggested in my former patents, and in such cases it will only be necessary to arrange the mechanism for shifting the paper in the direction of a line of writing instead of in a direction perpendicular thereto. The receiving-pen may in some cases consist of a simple pencil or tracer and the ink-supplying apparatus be dispensed with.

The closing and breaking of the local circuits for lowering and raising the receiving-pen may be effected by a special key instead of by the transmitting-pen, or by a circuit-closer arranged and operated in any suitable manner.

The paper, instead of being shifted in the manner shown, may be shifted in any other desired manner, as by changes in condition of the main-line currents or the means for shifting the paper or raising the pen, or both may be omitted; also, as stated in my prior Letters Patent Nos. 386,814 and 386,815, the movements necessary to reproduce the message instead of being imparted to the receiving-pen may be wholly or in part imparted to the paper. It is therefore to be understood that whenever the movement of the receiving-pen is referred to as forming the characters this also includes the equivalent movement of the paper, and that a recording-surface movable for the purpose of forming characters is for the purposes of this application the equivalent of a movable pen.

If preferred, two motors may be used for operating the receiving-pen, one governed by pulsations transmitted over each circuit.

No particular form of interrupter is essential in the practice of my invention. I intend to include under that term every device by means of which electric pulsations, whether successively of the same or opposite polarity, may be produced in the circuit.

I contemplate the use of each of the several foregoing improvements separately as well as in conjunction with each other. Thus, for instance, I intend to protect herein the feature of my invention which consists in employing pulsations of successively-opposite polarity whether those pulsations energize the motor-magnets of the receiving-pen directly, as in the organization shown in my said former patents, or whether they operate the receiving-pen by restraining or regulating the force which moves it, as in the organization shown herein, meaning to include both varieties of receiving-instruments when I speak of a motor or power mechanism governed or controlled in the application of its power to the receiving-pen by or caused to operate upon the receiving-pen through said pulsations, and so of my other several improvements.

Under the term "changes" or "variations" in the condition of the current as used in the claims, I mean to include changes of current strength, reversals of polarity, temporary cessations of current, and any other manipulation of the current whereby effects may be electrically produced at a distance.

With reference to the improvements in the art of telautographic communication herein claimed it is to be understood that the apparatus herein described is only one of many varieties of mechanism which may be devised for carrying out the several methods or processes which constitute such improvements. For instance, other forms of such mechanism are shown in my said applications, Serial Nos. 314,151 and 365,705. With respect to these improvements in said art I do not confine myself to any particular apparatus.

By the term "power mechanism" or "motor" as used herein it is intended to indicate any and every device from which power may be derived.

By referring to pulsations as "of substantially the same effective strength" I mean that they are the effects produced by partially or wholly interrupting a current in an electric circuit, the strength of such current in such circuit between such interruptions being sufficient to operate or permit the operation of the receiving-pen, and the interruptions preventing such current from operating or permitting the operation of said pen, whether the strength of the current changes or not, as distinguished from those systems wherein the effective strength of the current is purposely constantly varied by increments added to or taken from said current, which current continuously operates the receiving-pen during the operation of writing, an example of such last-mentioned systems being set forth in United States Letters Patent No. 217,588.

I do not intend to limit myself in any of my claims to the same construction of apparatus as that herein shown and described; but I intend to include within my claims every device and contrivance whatsoever substantially equivalent in this art to the several structures or the constituent elements thereof herein claimed.

Having thus described my invention, what I claim is—

1. The method of transmitting and recording a character by the movements of a transmitting-pen and a receiving-pen by transmuting the movements of the transmitting-pen into pulsations of successively-opposite polarity in an electric circuit varying in number with the linear extent of the movement of said pen and varying in speed of succession with the rapidity of said movement, and transmuting the said pulsations into movements of the receiving-pen, substantially as set forth.

2. The method of transmitting and recording a character by the movements of a transmitting-pen and a receiving-pen by transmuting the movements of the transmitting-pen into two series of electric pulsations, the pulsations of each series being successively of opposite polarity, and transmuting the said two series of pulsations into movements of the receiving-pen, substantially as set forth.

3. The method of transmitting and recording a character by the movements of a transmitting-pen and a receiving-pen by transmuting the movements of said transmitting-pen into two series of pulsations, the pulsations of each series being successively of opposite polarity and of substantially the same effective strength and respectively varying in number with the linear extent of the movement of said pen and varying in speed of succession with the rapidity of said movement, and transmuting said two series of pulsations into movements of the receiving-pen, substantially as set forth.

4. The method of transmitting and recording a character by the movements of a transmitting-pen and a receiving-pen by transmuting the movements of said transmitting-pen into electric pulsations of substantially the same effective strength, applying independent force to the receiving-pen, thereby imparting to it a tendency to move in a given direction, and regulating the operation of said force upon the receiving-pen through said pulsations, substantially as set forth.

5. The method of transmitting and recording a character by the movements of a transmitting-pen and a receiving-pen by transmuting the movements of said transmitting-pen into pulsations in an electric circuit, said pulsations being of substantially the same effective strength and varying in number with the linear extent of movement of said pen and varying in speed of succession with the rapidity of said movement, applying independent force to the receiving-pen, thereby imparting to it a tendency to move in a given direction, reversing the direction of the application of said force upon the receiving-pen to correspond with reversals in direction of motion of the transmitting-pen, and regulating the operation of said force upon the receiving-pen through said pulsations, substantially as set forth.

6. The method of transmitting and recording a character by the movements of a transmitting-pen and a receiving-pen by transmuting the movements of the transmitting-pen into electric pulsations of substantially the same effective strength, placing the receiving-pen under tension, tending to move it in a direction corresponding to the movement of the transmitting-pen, holding the receiving-pen in restraint as against said tension, reversing the direction of said tension to correspond with reversal of direction of movement of the transmitting-pen, and through the agency of said pulsations causing the restraint upon the receiving-pen to be suspended at regular successive intervals, so that the receiving-pen may move step by step in either direction as impelled by said tension, substantially as set forth.

7. The combination, with a transmitting-pen, of an electric circuit, means operated through said pen for producing pulsations of substantially the same effective strength in said circuit, a receiving-pen placed under tension to move in a certain direction, and restraining mechanism for holding the receiving-pen in restraint as against said tension, the operation of the restraining mechanism being suspended at successive intervals through the agency of said pulsations, so that the receiving-pen may move step by step as impelled by said tension, substantially as set forth.

8. The combination, with a transmitting-pen, of an electric circuit, means operated through said pen producing pulsations in said circuit, a receiving-pen placed under tension to move in a direction corresponding to the movement of the transmitting-pen, means for reversing the direction of said tension to correspond with reversal of direction of movement of the transmitting-pen, and restraining mechanism for holding the receiving-pen in restraint as against said tension, the operation of the restraining mechanism being suspended at successive intervals through the agency of said pulsations, so that the receiving-pen may move step by step as impelled by said tension, substantially as set forth.

9. The combination, with a transmitting-pen, of an electric circuit, means operated through said pen for producing pulsations in said circuit, said pulsations being of successively-opposite polarity, a receiving-pen, power mechanism independent as to its source of power of said pulsations for giving movement to the receiving-pen, restraining mechanism governed by said pulsations, and mechanism for reversing the direction of application to the receiving-pen of the power of the pen-moving mechanism to correspond with reversals in direction of movement of the transmitting-pen, substantially as set forth.

10. The combination, with a transmitting-pen, of electric connections with a receiving-station, means operated through said pen for producing two series of electric pulsations of substantially the same effective strength traversing said connections, a receiving-pen placed under tension to move in two directions crosswise of each other, and restraining mechanism for holding the receiving-pen in restraint as against said two tensions, the operation of said restraining mechanism being suspended at successive intervals through the agency of said pulsations, so that the receiving-pen may move step by step as impelled by said tensions, substantially as set forth.

11. The combination, with a transmitting-pen, of an electric circuit, means operated through said pen for producing pulsations in said circuit, power mechanism operated from a source of power independent of said pulsations, but controlled in its action through said pulsations, a receiving-pen moved by said power mechanism, and means for reversing the direction of application of the power of the power mechanism to the receiving-pen to correspond with reversals in direction of movement of the transmitting-pen, substantially as set forth.

12. The combination, with a transmitting-pen, of an electric circuit, means operated through said pen for producing pulsations successively of opposite polarity in said circuit, power mechanism operated from a source of power independent of said pulsations, but controlled in its action by said pulsations, and a receiving-pen moved by said power mechanism, substantially as set forth.

13. The combination, with a transmitting-pen, of electric connections with a receiving-station, means operated through said pen for producing electric pulsations of substantially the same effective strength, a receiving-pen, mechanism independent as regards its source of power of said pulsations for giving movement to the receiving-pen and caused to operate thereon through said pulsations, and connections for causing the pen-moving mechanism at the receiving-station to operate and drive the receiving-pen to one of its extreme points of movement when the transmitting-pen is moved to its corresponding extreme point of movement, substantially as set forth.

14. The combination, with a transmitting-pen, of electric connections with a receiving-station, means operated through said pen for producing electric pulsations, a receiving-pen placed under tension to move in a certain direction, restraining mechanism for holding the receiving-pen in restraint as against said tension, the operation of the restraining mechanism being suspended at successive intervals through the agency of said pulsations, so that the receiving-pen may move as impelled by said tension in correspondence with the movement of the transmitting-pen, and mechanism for suspending the restraint upon the tension tending to move the receiving-pen until the latter is driven to one of its extreme points of movement when the transmitting-pen is moved to its corresponding extreme point of movement, substantially as set forth.

15. The combination, with a transmitting-pen, of an electric circuit, an interrupter operated through said pen and producing pulsations of successively-opposite polarity in said circuit, a receiving-pen, and a power mechanism giving movement to the receiving-pen and governed in the application of its power to the receiving-pen by the said pulsations, substantially as set forth.

16. The combination, with a transmitting-pen, of two electric circuits, two interrupter devices operated through the movement of said pen in two directions crosswise of each other and producing a series of electric pulsations of successively-opposite polarity in each of said circuits, a receiving-pen, and a power mechanism giving movement to the receiving-pen in two directions crosswise of each other and governed in the application of its power to the receiving-pen by said pulsations, substantially as set forth.

17. The combination, with a transmitting-pen, of electrical connections with the receiving-station, two interrupter devices operated through the movement of said pen in two directions crosswise of each other and producing two series of electric pulsations of successively-opposite polarity, a receiving-pen, and mechanism giving movement to the receiving-pen in two directions crosswise of each other and caused to operate thereon through said pulsations, substantially as described.

18. The combination, with a transmitting-pen, of an electric circuit, devices operated through said pen and producing pulsations of successively-opposite polarity in said circuit, a receiving-pen, a power mechanism independent as regards the source of its power of the line-current, giving movement to the receiving-pen, and restraining mechanism governed by said pulsations, whereby the application of the power of the power mechanism to the receiving-pen is restrained, so that the movement of the receiving-pen is caused to correspond to that of the transmitting pen, substantially as set forth.

19. The combination, with a transmitting-pen, of an electric circuit, two batteries of unequal strength and opposed polarity in the circuit, an interrupter operated through the transmitting-pen and acting to alternately cut in and out of circuit the larger battery, so as to produce a series of pulsations of opposite polarity in the circuit, a receiving-pen, and a power mechanism giving movement to the receiving-pen and governed in the application of its power to the receiving-pen by the said pulsations, substantially as set forth.

20. The combination, with a transmitting-pen, of two electric circuits, two interrupters operated through the movement of said pen in two directions crosswise of each other and producing a series of electric pulsations of successively-opposite polarity in each of said circuits, a receiving-pen, a power mechanism independent as regards the source of its power of the line-current, giving movement to the receiving-pen in two directions crosswise of each other, and restraining mechanism governed by said pulsations, whereby the application of the power of the power mechanism to the receiving-pen is restrained, so that the movement of the receiving-pen is caused to correspond to that of the transmitting-pen, substantially as set forth.

21. The combination, with a transmitting-pen, of an electric circuit, an interrupter consisting of a series of contacts and a brush having movement the one relatively to the other operated through said pen and producing pulsations of successively-opposite polarity in said circuit, a receiving-pen, and mechanism giving movement to the receiving-pen and caused to operate thereon through said pulsations, substantially as set forth.

22. The combination, with a transmitting-pen, of an electric circuit, an interrupter operated through said pen and producing pulsations in said circuit, a motor giving movement to the receiving-pen and controlled in the application of its power to the receiving-pen by said pulsations, a reversing mechanism between the motor and the receiving-pen, whereby the direction of the movement of the latter may be reversed, and means for controlling the reversing mechanism from the transmitting-station so as to cause the direction of movement of the receiving-pen to be reversed upon the reversal of the direction of movement of the transmitting-pen, substantially as set forth.

23. In a telautographic system, the combination of a receiving-pen, a power mechanism giving movement thereto, a reversing mechanism between the power mechanism and the receiving-pen, whereby the direction of movement of the latter may be reversed, said reversing mechanism having as a part thereof a magnetically-controlled clutch, and electrical connections with the transmitting-station, whereby said clutch is controlled and the operation of the receiving-pen governed, substantially as set forth.

24. The combination, with a transmitting-pen, of an electric circuit, an interrupter operated through said pen and producing pulsations in said circuit, a motor giving movement to the receiving-pen and controlled in the application of its power to the receiving-pen by said pulsations, a reversing mechanism between the motor and the receiving-pen, whereby the direction of movement of the latter may be reversed, said reversing mechanism containing as parts thereof magnetically-controlled clutches, and electrical connections with the transmitting-station, whereby said clutches are controlled and the operation of the receiving mechanism governed, substantially as set forth.

25. The combination, with a transmitting-pen, of an electric circuit, an interrupter operated through said pen and producing pulsations in said circuit, a motor giving movement to the receiving-pen and controlled in the application of its power to the receiving-pen by said pulsations, a reversing mechanism between the motor and the receiving-pen, whereby the direction of movement of the latter may be reversed, said reversing mechanism containing as a part thereof magnetically-controlled clutches, and a magnet in electrical connection with the transmitting-instrument and operated therefrom, controlling the circuits of the clutch-magnets and causing them to be properly energized to change the direction of movement of the receiving-pen in correspondence with the changes in direction of movement of the transmitting-pen, substantially as set forth.

26. The combination, with a transmitting-pen, of an electric circuit, an interrupter operated through said pen and producing pulsations in said circuit, a power mechanism giving movement to the receiving-pen and controlled in the application of its power to the receiving-pen by said pulsations, a reversing mechanism between the motor and the receiving-pen, whereby the latter may be reversed, a polarized magnet for controlling the action of the reversing mechanism, and circuit connections with the transmitting-station, whereby currents of reversed polarity are caused to traverse the coils of said polarized magnet, such reversals of polarity corresponding to reversals in direction of movement of the transmitting-pen, substantially as set forth.

27. The combination, with a transmitting-pen, of an electric circuit, an interrupter operated through said pen and producing pulsations in said circuit, a receiving-pen, and means for giving movement to the receiving-pen in conformity to the pulsations reaching the receiving-instrument, a part of said means consisting of a toothed wheel operated step by step through the agency of said pulsations, whereby exact reproduction by the receiving-pen of the movements of the transmitting-pen is secured, substantially as set forth.

28. The combination, with a transmitting-pen, of an electric circuit, an interrupter operated through said pen and producing pulsations in said circuit, a receiving-pen, a power mechanism moving the receiving-pen, an escapement governing the power mechanism in the application of its power to the receiving-pen, and a magnet controlling the escapement and operated by said pulsations, substantially as set forth.

29. The combination, with a transmitting-pen, of an electric circuit, an interrupter operated through said pen and producing pulsations of successively-opposite polarity in said circuit, a receiving-pen, means for giving movement to the receiving-pen in conformity with the pulsations reaching the receiving-instrument, part of said means consisting of a step-by-step escapement device, and a magnet controlling the escapement and operated by said pulsations, substantially as set forth.

30. The combination, with a transmitting-pen, of an electric circuit, an interrupter operated through said pen and producing pulsations of successively-opposite polarity in the circuit, a receiving-pen, a power mechanism moving the receiving-pen, an escapement governing the power mechanism in the application of its power to the receiving-pen, and a polarized magnet controlling the escapement and operated by said pulsations, substantially as set forth.

31. The combination, with a transmitting-pen, of an electric circuit, an interrupter operated through said pen and producing pulsations in said circuit, a receiving-pen, a motor moving the receiving-pen, an escapement governing the motor in the application of its power to the receiving-pen, a magnet controlling the escapement and operated by said pulsations, and reversing mechanism between the motor and the receiving-pen electrically controlled by the movement of the transmitting-pen, substantially as set forth.

32. The combination, with a transmitting-pen, of an electric circuit, an interrupter operated through said pen and producing pulsations in said circuit, a receiving-pen, a motor moving the receiving-pen, a reversing mechanism between the motor and the receiving-pen electrically controlled by the movement of the transmitting-pen, a reversible escapement governing the motor in the application of its power to the receiving-pen, and a magnet controlling the reversible escapement and operated by said pulsations, substantially as set forth.

33. The combination, with a transmitting-pen, of two electric circuits, two interrupters operated through the movement of said pen in two directions crosswise of each other and producing a series of pulsations in each of said circuits, a receiving-pen, means for giving movement to the receiving-pen in two directions crosswise of each other in conformity with the pulsations reaching the receiving-instrument, a part of said means consisting of two toothed wheels moving step by step, one of said wheels for each of said two crosswise directions of motion of the transmitting-pen, whereby uniformity of movement between the transmitting-pen and the receiving-pen is secured, and magnets controlling the toothed wheels and operated by said pulsations, substantially as set forth.

34. The combination, with a transmitting-pen, of two electric circuits, two interrupters operated through the movements of said pen in two directions crosswise of each other and producing a series of pulsations in each of said circuits, a receiving-pen, a motor moving the receiving-pen in two directions crosswise of each other, two escapements governing the motor in the application of its power to the receiving-pen, one for each of the two crosswise directions of motion of the transmitting-pen, and magnets controlling the escapements and operated by said pulsations, substantially as set forth.

35. The combination, with a transmitting-pen, of two electric circuits, two interrupters operated through the movements of said pen in two directions crosswise of each other and producing pulsations in said circuits of successively-opposite polarity, a receiving-pen, a power mechanism moving the receiving-pen in two directions crosswise of each other, two escapements governing the power mechanism in the application of its power to the receiving-pen, one for each of the two crosswise directions of motion of the transmitting-pen, and polarized magnets controlling the escapements and operated by said pulsations, substantially as set forth.

36. The combination, with a transmitting-pen, of an electric circuit, an interrupter operated through said pen, consisting of a series of contacts and a brush having a movement relatively to each other and producing pulsations in said circuit, a receiving-pen, a power mechanism moving the receiving-pen, an escapement governing the power mechanism in the application of its power to the receiving-pen, and a magnet controlling the escapement and operated by said pulsations, substantially as set forth.

37. The combination, with a transmitting-pen, of an electric circuit, an interrupter consisting of a series of contacts and a brush having a movement the one relatively to the other, operated through said pen and producing pulsations of successively-opposite polarity in said circuit, a receiving-pen, means for giving movement to the receiving-pen in conformity with the pulsations reaching the receiving-instrument, a part of said means consisting of a step-by-step mechanism, whereby uniformity of movement between the transmitting-pen and the receiving-pen is secured, and a magnet controlling the step-by-step mechanism and operated by said pulsations, substantially as set forth.

38. The combination, with a transmitting-pen, of an electric circuit, an interrupter operated through said pen and producing electric pulsations, a power mechanism operated from a source of power independent of said pulsations, a receiving-pen moved by said power mechanism, and means whereby the application of the force of the power mechanism to the receiving-pen is controlled by said pulsations, substantially as set forth.

39. The combination, with a transmitting-pen, of an electric circuit, an interrupter operated through said pen, a receiving-pen, a power mechanism from which the receiving-pen is driven, the application of the power of the power mechanism to the receiving-pen being controlled by the said pulsations, and a unison device for bringing the position of the receiving-pen into correspondence with the position of the transmitting-pen, substantially as set forth.

40. The combination, with a transmitting-pen, of two electric circuits, two interrupters operated, respectively, through the movement of said pen in two directions crosswise of each other and producing two series of electric pulsations in said circuits, power mechanism operated from a source of power independent of said pulsations, and a receiving-pen driven by said power mechanism, the application of the power of the power mechanism to the receiving-pen being in two directions crosswise of each other and controlled by the said pulsations, substantially as set forth.

41. The combination, with a transmitting-pen, of an electric circuit, an interrupter operated through said pen and producing pulsations in said circuit, a receiving-pen, mechanism operated from a source of power independent of said pulsations for driving the same, mechanism for controlling the connection of the driving mechanism with the receiving-pen, said controlling mechanism being operated by said pulsations, and means controlled from the transmitting-station for suspending the operation of the controlling mechanism in order that the pen-driving mechanism at the receiving-station may run to unison with the transmitting mechanism, substantially as set forth.

42. The combination, in a telautographic system, of a transmitting-pen, a receiving-pen, mechanism for moving the receiving-pen caused to operate thereon through the movements of the transmitting-pen, a unison device for bringing the receiving-pen into unison with the transmitting-pen, a paper-shifting mechanism at the receiving-station, means for operating the same from the transmitting-station, and a circuit-controller and electric connections, whereby the unison device is brought into operation upon each shifting of the paper at the receiving-station, substantially as described.

43. The combination, in a telautographic system, of a paper-shifting mechanism forming part of the receiving-instrument, a receiving-pen, and a unison device for bringing the receiving-pen into unison with the transmitting-pen, the unison device being connected to the paper-shifting mechanism, so as to be brought into operation at each shifting of the paper, whereby the unison of the machine is effected at the commencement of each line of writing, substantially as described.

44. The combination, with a transmitting-pen, of an electric circuit, an interrupter operated through said pen and producing pulsations in said circuit, a receiving-pen, means for placing the receiving-pen under tension, means for reversing the direction of said tension to correspond with reversals in direction of motion of the transmitting-pen, and a reversible escapement holding said receiving-pen in restraint as against said tension and operated through said pulsations to permit the receiving-pen to move in either direction step by step, substantially as set forth.

45. The combination of an escapement in which the engaging teeth have their opposite faces of substantially the same shape, so that it will operate with equal facility in either direction if the strain which controls it be reversed, a power mechanism held in restraint by said escapement, means for reversing the direction of the strain of the power mechanism upon the escapement, and a magnet for controlling the escapement, substantially as set forth.

46. The combination, with a transmitting-pen, of an electric circuit, an interrupter operated through said pen and producing pulsations successively of opposite polarity upon line, a receiving-pen, a motor for driving the same, an escapement-magnet in the circuit for governing the application of the power of the motor to the receiving-pen in accordance with the pulsations, and means controlled from the transmitting-station for causing the escapement to become inoperative for the purpose of permitting the pen-driving mechanism at the receiving-station to run to unison with the transmitting mechanism, substantially as set forth.

47. The combination, with a transmitting-pen, of an electric circuit, an interrupter operated through the transmitting-pen for producing pulsations in the circuit, a receiving-pen, and mechanism operated through said pulsations for giving motion to the receiving-pen, the interrupter having a lost motion with respect to the transmitting-pen upon reversal in the direction of movement of the transmitting-pen, whereby the transmission of pulsations is suspended at the moment of reversal in direction of movement of the transmitting-pen, substantially as set forth.

48. The combination, with the transmitting and receiving pens, of a pen-rest for raising the pen from the paper, two electro-magnets, one for elevating and the other for depressing the pen-rest, electrical connections having a circuit-controller at the transmitter for energizing one or the other of said magnets to elevate or depress the pen-rest, and a movable table beneath the transmitting-pen for operating said circuit-controller, substantially as set forth.

49. The combination, with the receiving-pen and the circuits through which it is operated, of a pen-rest, two magnets for controlling the position of the pen-rest, one for elevating and one for depressing the same, electrical connections for each magnet, and relays in said circuits, the armatures of which control the circuits of the pen-rest magnets, substantially as set forth.

50. The combination, with the receiving-pen and the line-circuits through which it is operated, of a recording-surface over which the pen moves to reproduce the message, a feeding mechanism for shifting the recording-surface at times when the writing is suspended, a consequent-pole electro-magnet for controlling said feeding mechanism, said magnet having two sets of oppositely-wound coils, two local circuits for the coils of said electro-magnet, relays in said line-circuits, and electrical connections for simultaneously making or breaking the two circuits of the consequent-pole electro-magnet, whereby the operator at the transmitting-station can control the shifting of the paper at the receiving-station, substantially as set forth.

51. The combination, with the receiving-pen, of a recording-surface over which the pen moves to reproduce the message, a feeding mechanism for shifting the recording-surface, a consequent-pole electro-magnet for controlling said feeding mechanism, said magnet being provided with two sets of oppositely-wound coils, a pen-rest and two magnets, one for elevating and one for depressing the same, the two pen-rest magnets being respectively in circuit with the two sets of coils of the paper-shifting magnet, and electrical connections having circuit makers and breakers at the transmitting-station, whereby the transmitting operator can operate either the pen-raising magnet or the pen-depressing magnet or can operate simultaneously both of the circuits of these magnets, thereby operating the paper-shifting magnet, substantially as set forth.

52. As a means for performing three operations at the receiving-station over two line-wires, the combination of two magnets acting oppositely upon an armature, two local circuits, one for each magnet, a magnet having separate coils in circuit, respectively, with the two first-named magnets, said coils being so arranged with reference to the magnet that the latter is affected to attract its armature only when both of its circuits are closed, and electrical connections controlled from the transmitting-station, whereby the transmitting operator can make or break at will either of the local circuits at the receiving-station separately or both of the same simultaneously, substantially as set forth.

53. In a telautograph system, the combination, with a receiving-pen, of a recording-surface, a feeding mechanism for shifting the recording-surface, an electro-magnet controlling said feeding mechanism, a power mechanism for giving motion to the receiving-pen, and a unison-circuit, and mechanism for bringing the transmitting and receiving pens into unison with each other, said unison-circuit being controlled by the armature of the magnet for shifting the recording-surface, whereby the shifting of the paper and the bringing of the receiver into unison with the transmitter is simultaneously effected, substantially as set forth.

54. In a telautograph system, the combination of a transmitting-pen, two electric circuits, two interrupters operated, respectively, through the movement of said pen in two directions crosswise of each other and producing two series of electric pulsations in said circuits, and means whereby the said pulsations are caused to control the movements of the receiving-pen, the transmitting-pen and the two interrupters being so placed with reference to the line of writing traversed by the transmitting-pen that the said two directions of movement shall be oblique to the said line of writing, whereby the pulsations caused by the perpendicular and those caused by the horizontal movements of the pen are divided between the two circuits, substantially as set forth.

55. In a telautograph system, the combination of a transmitting and receiving instrument, each provided with a telautographic pen, located at the same station, the writing-fields of the pens overlapping or a single writing-field serving for both pens, a recording-surface passing under the pens of both instruments, and electrical connections and circuit makers and breakers at the said station and also at the distant station, whereby the paper may at either station be moved by the sending-operator, substantially as set forth.

56. In a telautographic system, the combination, at a single station, of a transmitting-pen, a receiving-pen, the two pens being placed in such relation to each other that their writing-fields overlap, and means for holding each of the pens when not in use out of the way of the pen being used, substantially as set forth.

57. In a telautographic system, the combination, at a single station, of a transmitting-pen, a receiving-pen, a single paper upon which both are adapted to operate, and means for holding the transmitting-pen and its cords sufficiently above the paper when not in use to permit the receiving-pen to operate beneath them, substantially as set forth.

58. In a telautograph system, the combination of a receiving-pen, a power mechanism for giving movement to the same, means for controlling the power mechanism from the transmitting-station, a drum rotated by the power mechanism, an arm to which the receiving-pen is attached, and a cord connected at each end to the pen-arm and passing around the drum, whereby the rotation of the drum in either direction causes a corresponding movement of the pen-arm, substantially as described.

59. The combination, with a transmitting-pen, of an electric circuit, means operated through said pen for producing pulsations in the circuit, a receiving-pen, a power mechanism independent as regards the source of its power of the line-current for giving movement to the receiving-pen and governed in its application of power to the receiving-pen through said pulsations, and electrical connections with the transmitting-station controlling the operation of the power mechanism, whereby cessation of the pulsations brings the power mechanism to rest, substantially as set forth.

60. The combination, with a transmitting-pen, of an electric circuit, means operated through said pen for producing pulsations in the circuit, a receiving-pen, an electric motor for giving movement to the receiving-pen and governed in the application of its power to the receiving-pen through said pulsations, a circuit for the motor independent of the line-circuit, and electrical connections with the transmitting-station, whereby cessation of the pulsations causes a break in the circuit of the motor and brings it to rest, substantially as set forth.

61. The combination, with a transmitting-pen at a transmitting-station, of electrical connections with a receiving-station, an electric current traversing said connections, means for causing changes of variations in the condition of said current to correspond with the movements of the transmitting-pen, a receiving-pen, a weight or its equivalent for giving movement to the receiving-pen, controlled in the application of its power thereto by said electric current, an electrically-controlled clutch, the position of which controls the connection of the weight with the receiving-pen, and electrical connections whereby the clutch may be operated and the weight so connected to or disconnected from the receiving-pen, substantially as set forth.

62. The combination, with a transmitting-pen, of an electric circuit, an interrupter operated through said pen and producing pulsations in said circuit, a receiving-pen, a weight for giving movement to the receiving-pen, controlled in the application of its power to the receiving-pen by said pulsations, an electrically-controlled clutch, the position of which determines the connection of the weight with the receiving-pen, and electrical connections with the transmitting-station, whereby the clutch may be operated and the weight so connected to or disconnected from the receiving-pen, substantially as set forth.

63. The combination, with a transmitting-pen, of an electric circuit, an interrupter operated through said pen and producing pulsations in said circuit, a receiving-pen, a weight for giving movement to the receiving-pen and controlled in the application of its power to the receiving-pen through said pulsations, an electrically-controlled clutch, the position of which determines the connection of the weight with the receiving-pen, electrical connections with the transmitting-station, whereby the clutch may be operated and the weight connected to or disconnected from the receiving-pen, and a motor for winding up the weight, substantially as set forth.

64. The combination, with a transmitting-pen at a transmitting-station, of electrical connections with a receiving-station, an electric current traversing said connections, means for causing changes or variations in the condition of said current to correspond with the movements of the transmitting-pen, a receiving-pen, two weights or their equivalents for giving movement to the receiving-pen and connected thereto so as to produce movements thereof in opposite directions, respectively, each weight being governed in the application of its power to the receiving-pen by said electric current, and electrical connections with the transmitting-station, whereby selection between the weights is made in accordance with the direction of motion of the transmitting-pen, substantially as set forth.

65. The combination, with a transmitting-pen, of an electric circuit, an interrupter operated through said pen and producing pulsations in said circuit, a receiving-pen, two weights for giving movement to the receiving-pen and connected thereto so as to produce movements thereof in opposite directions, respectively, each weight being governed in the application of its power to the receiving-pen by the said pulsations, and electrical connections with the transmitting-station whereby selection between the weights is made in accordance with the direction of movement of the transmitting-pen, substantially as set forth.

66. The combination, with a transmitting-pen, of an electric circuit, an interrupter operated through said pen and producing pulsations in said circuit, a receiving-pen, two weights for giving movement to the receiving-pen and connected thereto so as to produce movements thereof in opposite directions, respectively, each weight being provided with a magnetic clutch, the position of which determines its connection with the receiving-pen, and each weight being governed in the application of its power to the receiving-pen by the said pulsations, and electrical connections with the transmitting-station, whereby the magnet-clutches of the weights are controlled and thereby one or the other of the weights caused to operate upon the receiving-pen to accord with the direction of movement of the transmitting-pen, substantially as set forth.

67. The combination of a transmitting-pen at a transmitting-station, electrical connections with a receiving-station, an electric current, means for causing changes or variations in the condition of the current, a receiving-pen, a force or prime motor for driving the receiving-pen and controlled in its operation thereon through said changes or variations, a weight introduced between the prime motor and the receiving-pen, the prime motor operating to raise the weight, so that the weight may drive the pen, and means for alternately making and interrupting the connection between the prime motor and the weight and the weight and the receiving-pen, so that the weight may be raised and the pen driven in alternation, substantially as set forth.

68. The combination, with a transmitting-pen, of an electric circuit, an interrupter operated through said pen and producing pulsations in said circuit, a receiving-pen, two weights for giving movement to the receiving-pen and connected thereto so as to produce movements thereof in opposite directions, respectively, each weight being governed in the application of its power to the receiving-pen by the said pulsations, electric connections with the transmitting-station, whereby the weights are controlled and thereby one or the other of the weights caused to operate upon the receiving-pen to accord with the direction of movement of the transmitting-pen, and a motor for winding up the weights, substantially as set forth.

69. The combination of a transmitting-pen at a transmitting-station, electrical connections with a receiving-station, a receiving-pen, mechanism for driving the receiving-pen, a part of said mechanism consisting of a magnetic frictional clutch, a magnet for controlling the magnetic condition of said clutch, and means whereby the electrical condition of said magnet is controlled from the transmitting-station and the movements of the receiving-pen thereby affected, substantially as set forth.

70. The combination of a transmitting-pen at a transmitting-station, electrical connections with a receiving-station, a receiving-pen, mechanism for driving the receiving-pen, reversing mechanism between the driving mechanism and the receiving-pen, a part of said reversing mechanism consisting of magnetic frictional clutches, coils placed in connection with magnetizable parts of said clutches, and means whereby the electric condition of said coils is controlled from the transmitting-station, so as to cause the direction of movement of the receiving-pen to be reversed in correspondence with reversal in direction of motion of the transmitting-pen, substantially as set forth.

71. The combination, with a transmitting-pen, of an electric circuit, an interrupter operated through said pen and producing pulsations in said circuit, a receiving-pen, two weights for giving movement to the receiving-pen and connected thereto so as to produce movements thereof in opposite directions, respectively, each weight being governed in the application of its power to the receiving-pen by the said pulsations, electrical connections with the transmitting-station, whereby the weights are controlled and thereby one or the other of the weights caused to operate upon the receiving-pen to accord with the direction of movement of the transmitting-pen, a motor for winding up the weights, two magnets rotated by the motor, two drums or disks, to which the weights are attached, acting as armatures for the magnets, and electrical connections whereby the magnets are energized to wind up each of the weights while it is disconnected from the receiving-pen, substantially as set forth.

72. The combination of a receiving-pen or other driven mechanism, two weights for giving movement to the driven mechanism and so connected therewith as to produce movements thereof in opposite directions, respectively, electrical connections whereby either one or the other of the weights may be caused to act upon the driven mechanism, as desired, a motor for winding up the weights, clutch-magnets whereby the connection between the motor and the weights is controlled, and electrical connections whereby the clutch-magnets are operated to cause the motor to wind up each weight when it is disconnected from the driven mechanism, substantially as set forth.

73. The combination of a receiving-pen or other driven mechanism, two weights for giving movement to the driven mechanism and so connected therewith as to produce movements thereof in opposite directions, respectively, electrical connections whereby either one or the other of the weights may be caused to act upon the driven mechanism, as desired, a motor for winding up the weights, clutch-magnets whereby the connection between the motor and the weights is controlled, electrical connections whereby the clutch-magnets are operated to cause the motor to wind up each weight when it is disconnected from the driven mechanism, and circuit connections whereby each clutch-magnet is de-energized when it has raised its weight to a certain height, subtantially as set forth.

74. The combination of a receiving-pen or other driven mechanism, two weights for giving movement to the driven mechanism and so connected therewith as to produce movement thereof in opposite directions, respectively, electrical connections whereby either one or the other of the weights may be caused to act upon the driven mechanism, as desired, a motor for winding up the weights, two drums or disks to which the weights are respectively attached, two magnets rotated by the motor, said drums or disks acting, respectively, as armatures for said magnets, and electrical connections whereby each of the said magnets is energized and caused to attract its disk and lift one of the weights when such weight is disconnected from the driven mechanism, substantially as set forth.

75. The combination of a receiving-pen or other driven mechanism, two weights for giving movement to the driven mechanism and so connected therewith as to produce movement thereof in opposite directions, respectively, each of said weights having as a part thereof or attached thereto a magnetic clutch, electrical connections whereby either one or the other of the clutches may be operated and its weight thereby caused to act upon the driven mechanism, as desired, a power mechanism for winding up the weights, two disks from which the weights are suspended, each disk being provided with a metallic surface capable of magnetic attraction, two magnets rotated by the power mechanism, the excitable portion of each of the magnets being in frictional contact with the magnetizable surface of one of the disks, and electrical connections whereby each of said magnets is energized and caused to attract its disk and lift one of the weights when such weight is disconnected from the driven mechanism, substantially as set forth.

76. The combination of a receiving-pen, the drum 39, connected thereto, the cord 8, the magnet-weights M N, means for controlling the alternate engagement of said magnet-weights with the cord from the transmitting-station, and means for raising the weights when disconnected, respectively, from the cord, substantially as set forth.

77. The combination of a receiving-pen, the drum 39, connected thereto, the cord 8, the magnet-weights M N, means for controlling the alternate engagement of said magnet-weights with the cord from the transmitting-station, the power-shaft 30, magnets X Y, attached thereto, armature-disks 28 29, connected with the weights, and means whereby the magnets X Y are alternately energized from the transmitting-station for the purpose of raising the weights, substantially as set forth.

78. The combination of a transmitting-pen, a receiving-pen, electrical connections between the transmitting and the receiving pens, a motor for giving motion to the receiving-pen, a magnet, as X, fixed to the shaft of the motor, an armature-disk, as 28, a weight suspended from the disk and connected with the receiving-pen, and means for intermittently energizing the magnet to cause it to raise the weight, substantially as set forth.

79. The combination, with the power-shaft 30, the magnet, as X, attached thereto, an armature-disk, as 28, a weight, as M, suspended from the disk, means for intermittently energizing the magnet to cause the weight to be raised, a pen connected with the weight and driven by it as it falls, and circuit connections operated at a certain elevation of the weight to de-energize said magnet, substantially as set forth.

80. The magnet M, provided with a movable core 15 and armature 16, attached thereto, in combination with a cord 8 and pen connected therewith, said cord passing through the magnet and its core, the movable core constituting a clutch-piece, whereby the magnet is alternately connected with the cord to drive the pen and disconnected therefrom, substantially as and for the purposes set forth.

81. In a telautographic system, the combination of a receiving-pen, a weight or other prime motor for giving motion thereto, an electro-magnetic clutch between the weight and the receiving-pen, and electrical connections between the clutch and the transmitting-station, whereby said clutch is controlled and the operation of the receiving-pen governed, substantially as described.

82. The combination, with a telautographic receiving-pen, of a support therefor consisting of a flat horizontal surface and provided with an approach inclined upward from the table, so that the pen-nib may automatically ride up thereon, substantially as described.

83. The combination, with a telautographic pen, of a support for the same, consisting of a flat non-absorbent surface, whereby escape and evaporation of fluid are more or less prevented, substantially as set forth.

84. In a telautographic system, the combination of a telautographic transmitting-pen, a telautographic receiving-pen, a single writing-platen furnishing a single writing-field or overlapping writing-fields for both pens, and means for withdrawing the receiving-pen from the platen when not in use, substantially as set forth.

85. The combination, with a transmitting-pen, of an electric circuit, an interrupter operated through said pen and producing pulsations in said circuit, a power mechanism giving movement to the receiving-pen and controlled in the application of its power to the receiving-pen by said pulsations, a reversing mechanism between the motor and the receiving-pen, whereby the direction of movement of the latter may be reversed, and a separate line-wire and connections for controlling the reversing mechanism from the transmitting-station, so as to cause the direction of movement of the receiving-pen to be reversed upon the reversal of the direction of movement of the transmitting-pen, substantially as set forth.

86. In a telautographic system, the combination of a transmitting-pen, circuit-controlling devices, connections between the circuit-controlling devices and the transmitting-pen, whereby the movements of the pen effect changes or variations in the condition of the line-current, a portion of these connections having a spring action, and a switch for throwing the instrument from the transmitting to the receiving position, and vice versa, said switch being provided with a portion adapted to hold the transmitting-pen and being also provided with a spring adapted to hold it in that position wherein the instrument is set for sending messages, the switch being so placed and the switch-spring being so adjusted with reference to the spring connections between the transmitting-pen and the circuit-controlling devices that when the transmitting-pen is placed upon the pen-holding portion of the switch the instrument is turned from the sending to the receiving position, substantially as set forth.

87. The combination of a sending and receiving instrument at one station, a switch for shifting the line-wires from one instrument to the other, electrical connections with the distant station, whereby the receiving-pen at that station may be withdrawn from its recording position, and a circuit-controller connected to the said switch, whereby said connections are operated and the distant receiving-pen is withdrawn from its field upon the shifting of the switch from the sending to the receiving position, substantially as set forth.

88. In a telautographic system, the combination of a receiving-pen, a power mechanism giving movement to the receiving-pen, an escapement controlled from the transmitting-station and governing the operation of the power mechanism upon the receiving-pen, and means also controlled from the transmitting-station for disconnecting the escapement from the receiving-pen, substantially as set forth.

89. In a telautographic system, the combination of a transmitter provided with a telautographic transmitting-pen and a receiver provided with a telautographic receiving-pen at a single station, and a single writing-field or overlapping writing-fields for both pens, substantially as set forth.

90. The combination of a rotating shaft, a disk mounted so as to rotate freely thereon, a weight connected with the disk, a receiving-pen or other driven mechanism, and electrically-controlled mechanism for alternately connecting the weight with the pen, so as to drive the same and the disk with the shaft, so as to raise the weight, substantially as set forth.

91. The combination, with a transmitting-pen, of an electric circuit, an interrupter operated through said pen and producing pulsations of successively-opposite polarity in said circuit, mechanism for driving the receiving-pen caused to operate thereon through said pulsations, a reversing mechanism between the driving mechanism and the receiving-pen, whereby the direction of movement of the latter may be reversed, electrical connections with the transmitting-station for controlling the reversing mechanism, and connections with the transmitting-pen, whereby the polarity of the current on the reversing-circuit is reversed upon a reversal in direction of motion of the transmitting-pen, said reversal of polarity causing the reversing mechanism at the receiving-station to operate and reverse the direction of motion of the receiving-pen, substantially as set forth.

92. The combination, with the transmitting and receiving pens, of a pen-rest for raising the receiving-pen from the paper, two electro-magnets, one for elevating and the other for depressing the pen-rest, and electrical connections controlled from the transmitting-station, whereby the transmitting operator may energize one or the other of said magnets to elevate or depress the receiving-pen, substantially as set forth.

93. In a telautographic system, the combination of a transmitting-instrument and a receiving-instrument located at the same station, the pens of said instruments moving in a single writing-field or overlapping fields and a single recording-surface serving for the pens of both instruments, substantially as set forth.

94. In a telautographic system, the combination of a transmitting-instrument, a receiving-instrument located at the same station, each instrument being provided with a telautographic pen, the pens of both instruments moving in a single writing-field or overlapping fields, a single recording-surface serving for the pens of both instruments, a feeding mechanism for shifting the recording-surface, a transmitting-instrument located at a distant station, and connections whereby said feeding mechanism may be operated both by the operator at the home station and by the operator at the distant station, substantially as set forth.

95. The combination of a transmitting-pen, a pen-rack therefor, electrical connections with a distant station for driving the receiving-pen at that station to a selected position, as $l$, and a circuit-controller governing said connections connected with the pen-rack and operated by the placing of the pen therein to cause the receiving-pen to be driven to said selected position, substantially as set forth.

96. The combination of a receiving-pen, electrical connections with a transmitting-station, whereby the receiving-pen may be driven to a selected position, as $l$, a circuit-controller governing said connections, and a retarding device for causing the operation of the circuit-controller to occupy a certain length of time sufficient for the driving of the receiving-pen to said selected position, substantially as set forth.

97. The combination of a receiving-instrument provided with a receiving-pen, an electric circuit connecting the receiving-instrument with a transmitting-station, power mechanism giving motion to the receiving-pen and caused to operate thereon through electric pulsations traversing said circuit from the transmitting-station, said power mechanism being independent as to its source of power of said pulsations and said pulsations being of substantially the same effective strength, and fixed stops defining the range of movement which can be given to the receiving-pen by the power mechanism, substantially as set forth.

98. The combination of a receiving-pen, a pen-rest for the same, electrical connections with a transmitting-station, and an increase-controller operating to temporarily increase the current normally traversing said connections, whereby the transmitting operator may control the position of the pen-rest and consequently of the receiving-pen, substantially as set forth.

99. The combination, with a transmitting-pen, a receiving-pen, main-line circuits, and means whereby the receiving-pen is caused to move through the agency of pulsations produced in said circuits through the movements of the transmitting-pen, of an independent reversing-circuit, devices whereby reversal of direction of movement of the transmitting-pen causes a change of polarity in the current traversing the reversing-circuit and consequent reversal in the direction of movement of the receiving-pen, a pen-rest for the receiving-pen, and electrical connections whereby the operator at the transmitting-station may change the strength of current on the reversing-circuit and thereby raise or lower the receiving-pen, substantially as set forth.

100. The combination, with a transmitting-pen, a receiving-pen, main-line circuits, and means whereby the receiving-pen is caused to move through the agency of pulsations produced in said circuits by the movement of the transmitting-pen, of an independent reversing-circuit, devices whereby reversal of direction of movement of the transmitting-pen causes a change of polarity in the current traversing the reversing-circuit and consequent reversal in the direction of movement of the receiving-pen, a recording-surface for the receiving-pen, feeding mechanism for moving the recording-surface, and electrical connections whereby the operator at the transmitting-station may change the strength of current in the reversing-circuit for the purpose of operating the feeding mechanism to shift the recording-surface, substantially as set forth.

101. The combination of a receiving-pen, a pen-rest therefor, two line-circuits provided with connections for changing the strength of current in one or the other of the circuits to raise or depress the pen-rest, respectively, a magnetically-controlled paper-shifting mechanism at the receiving-station, and connections at the transmitting-station, whereby the operator can simultaneously change the current strength in both of said circuits and thereby shift the paper at the receiving-station, substantially as set forth.

102. The combination, with a receiving-pen, of a stationary recording-surface over which the pen moves to reproduce the message, a feeding mechanism for shifting the recording-surface, an electro-magnet controlling the feeding mechanism, local electric circuits including said magnets, two line-wires controlling said local circuits, and devices at the transmitting-station for producing simultaneously upon both of the line-circuits a current of temporarily-increased strength, whereby the transmitting operator may control the said local circuits and cause the paper to be shifted, substantially as set forth.

In testimony whereof I have hereunto set my hand in the presence of two subscribing witnesses.

ELISHA GRAY.

Witnesses:
 MARY A. JENNINGS,
 EDWARD FETTER.